US008249504B2

(12) United States Patent
Fujii

(10) Patent No.: US 8,249,504 B2
(45) Date of Patent: Aug. 21, 2012

(54) SETTING PARAMETERS IN A COMMUNICATION DEVICE FOR NETWORK CONNECTION

(75) Inventor: Kenichi Fujii, Katsushika-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1106 days.

(21) Appl. No.: 11/282,065

(22) Filed: Nov. 16, 2005

(65) Prior Publication Data

US 2006/0111097 A1    May 25, 2006

(30) Foreign Application Priority Data

Nov. 19, 2004 (JP) .................................. 2004-336221
Oct. 31, 2005 (JP) .................................. 2005-317117

(51) Int. Cl.
*H04B 7/00* (2006.01)
(52) U.S. Cl. ............. 455/41.2; 455/411; 726/4; 726/21; 726/26; 713/175
(58) Field of Classification Search .................. 455/420, 455/41.2, 41.3, 411; 726/26, 4, 21; 713/175
See application file for complete search history.

(56) References Cited

U.S. PATENT DOCUMENTS

| 6,161,134 | A | 12/2000 | Wang et al. | |
|---|---|---|---|---|
| 7,076,269 | B2* | 7/2006 | Konishi et al. | 455/552.1 |
| 2002/0115426 | A1 | 8/2002 | Olson et al. | |
| 2002/0147819 | A1* | 10/2002 | Miyakoshi et al. | 709/228 |
| 2003/0092395 | A1 | 5/2003 | Gassho et al. | |
| 2003/0130906 | A1* | 7/2003 | Maari | 705/26 |
| 2004/0187001 | A1* | 9/2004 | Bousis | 713/175 |
| 2004/0203600 | A1 | 10/2004 | McCorkle et al. | |
| 2004/0268131 | A1* | 12/2004 | Kudo et al. | 713/182 |

FOREIGN PATENT DOCUMENTS

| EP | 1379030 A | 1/2004 |
|---|---|---|
| JP | 2001-177599 A | 6/2001 |
| JP | 2002-359623 | 12/2002 |
| JP | 2003-188788 A | 7/2003 |
| JP | 2003-218730 | 7/2003 |
| JP | 2004-127187 A | 4/2004 |
| JP | 2004-173162 A | 6/2004 |
| JP | 2004-260300 A | 9/2004 |
| JP | 2004-304315 A | 10/2004 |

OTHER PUBLICATIONS

European Search Report dated Mar. 2006. Communication from European Patent Office dated Mar. 22, 2006.
The above foreign patent documents were cited in a May 16, 2011 Japanese Office Action, which is enclosed without an English Translation, that issued in Japanese Patent Application No. 2005-317117.

* cited by examiner

*Primary Examiner* — Amanico Gonzalez
(74) *Attorney, Agent, or Firm* — Cowan, Liebowitz & Latman, P.C.

(57) ABSTRACT

In a communication control method for wireless communication between a first communication device and a second communication device through a wireless communication unit, identification information is notified from the second communication device to the first communication device by using a communication unit other than the wireless communication unit. Wireless communication between the first and second communication devices is performed by the wireless communication unit using the first communication parameter shared in advance, and authentication processing based on identification information is performed. When authentication is acquired by this authentication processing, the second communication parameter to be set with respect to a wireless communication unit is shared by the first and second communication devices through the above wireless communication. Parameters for wireless communication between the first and second communication devices are set in the wireless communication unit by using the second communication parameter shared in this manner.

31 Claims, 27 Drawing Sheets

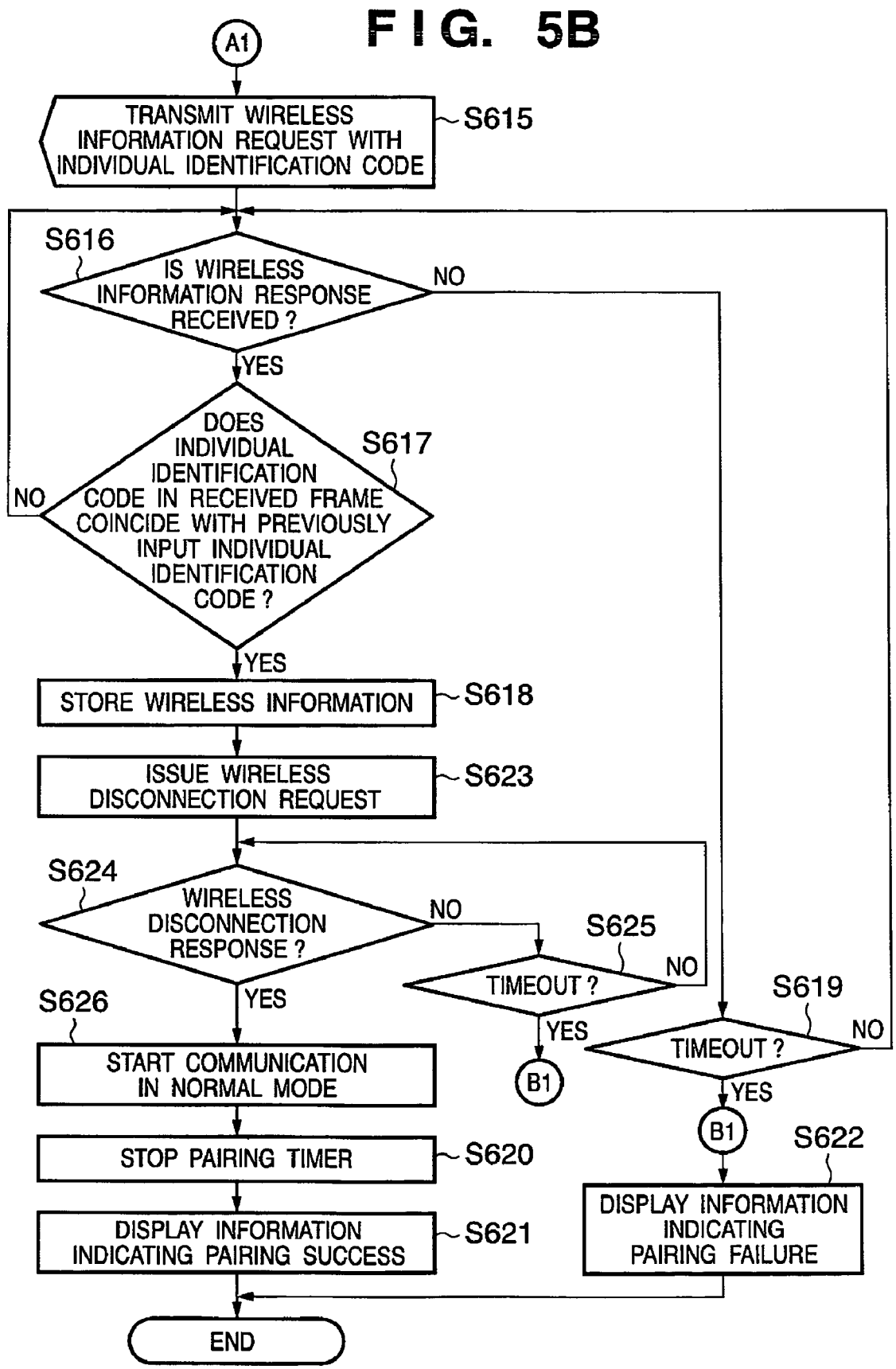

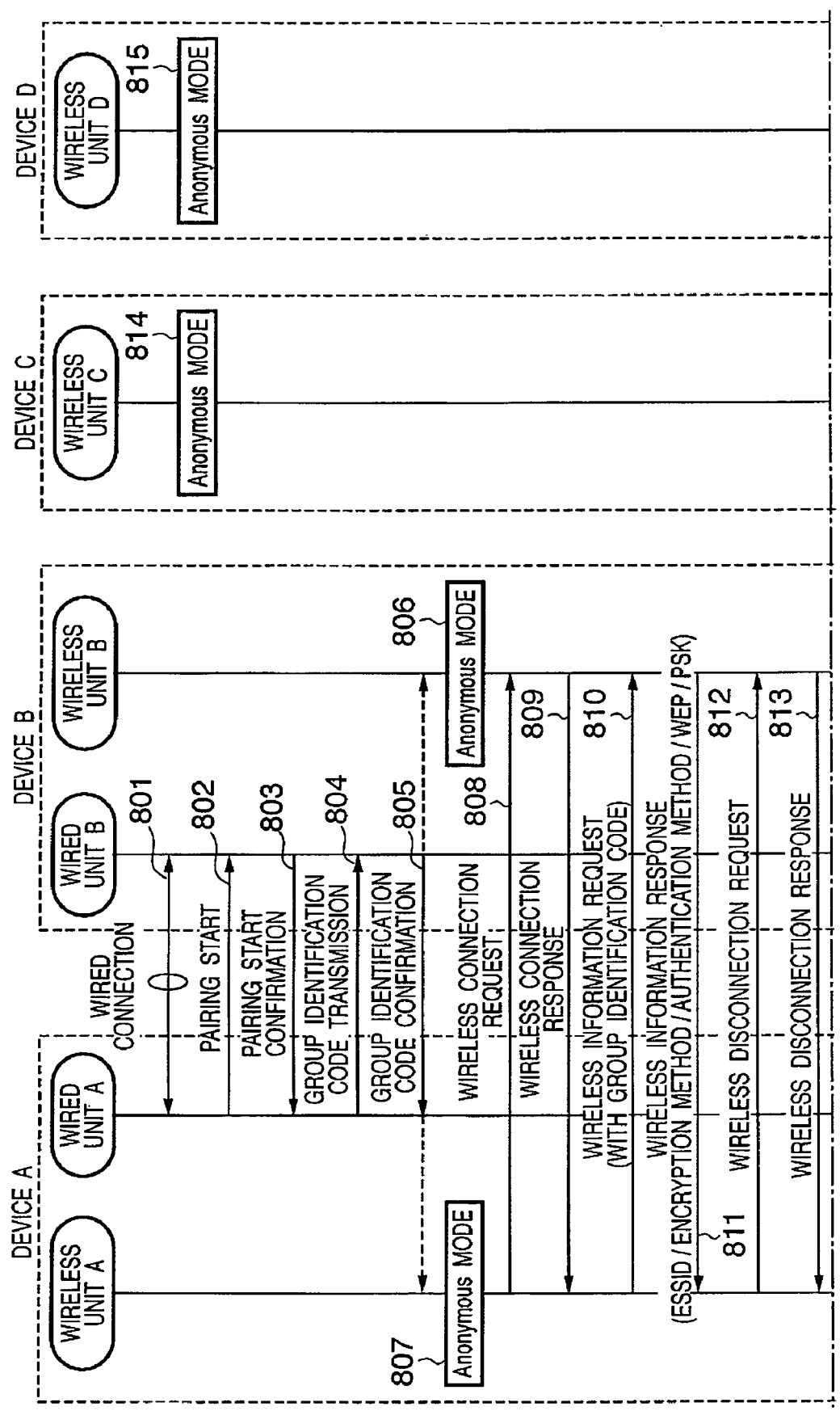

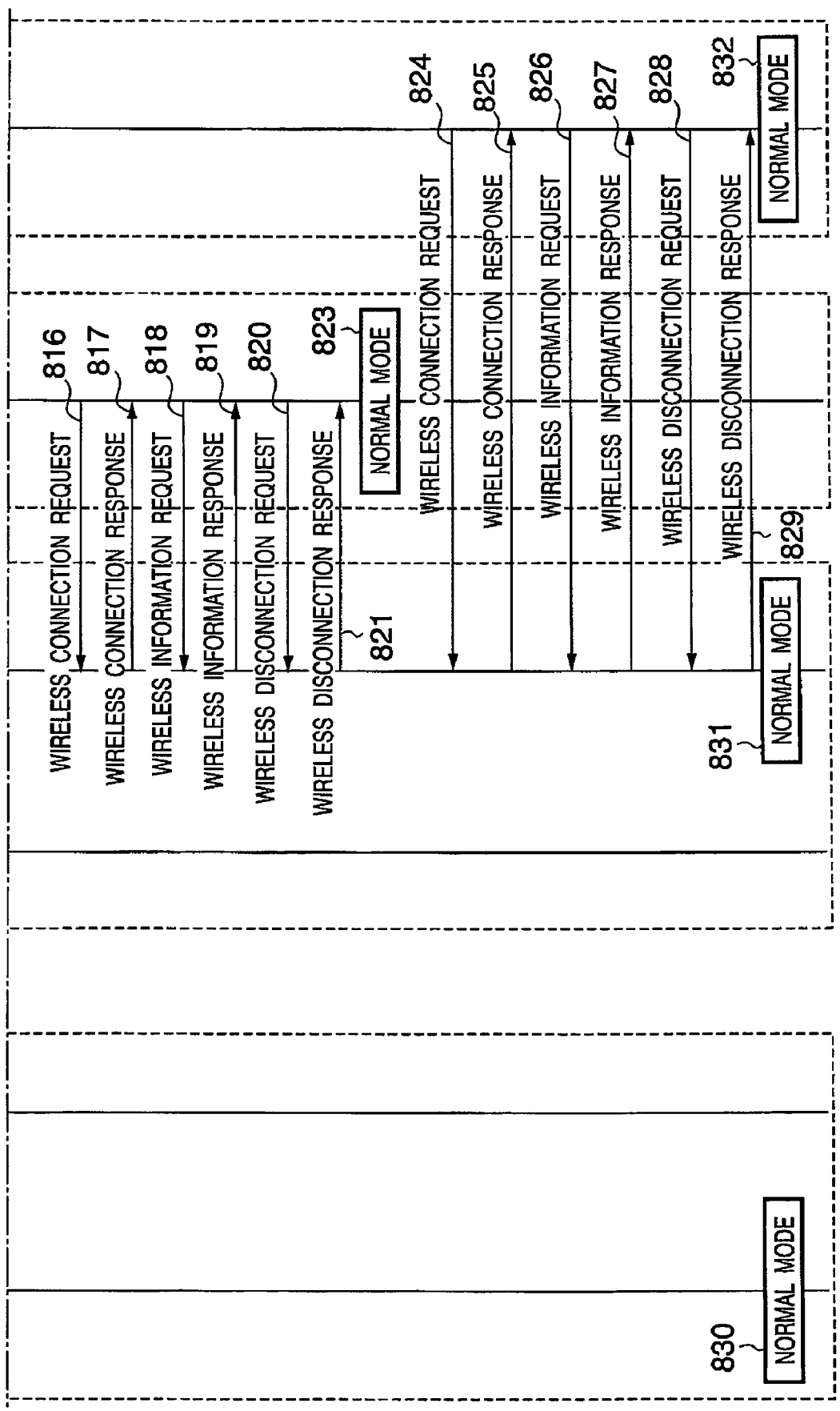

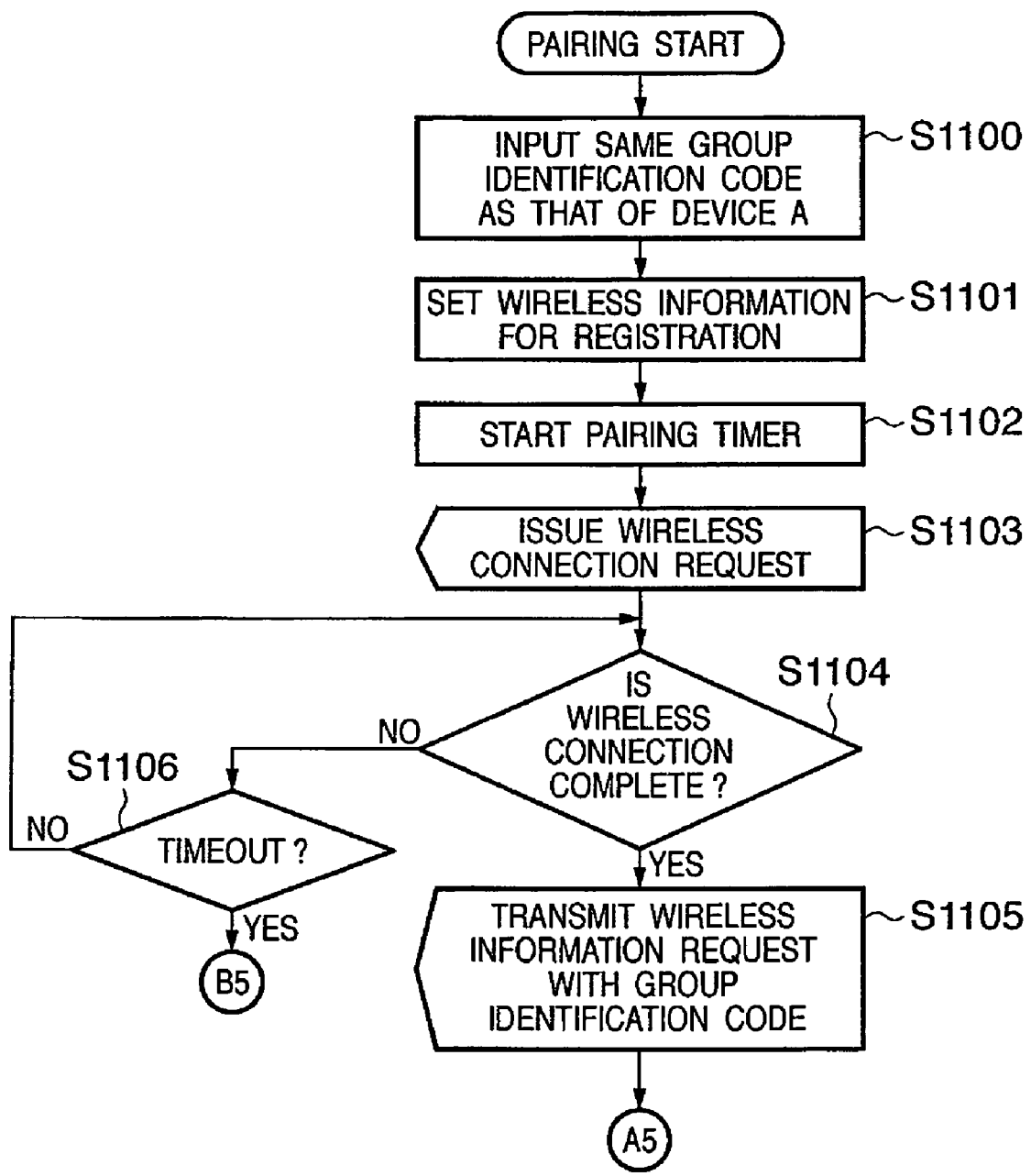

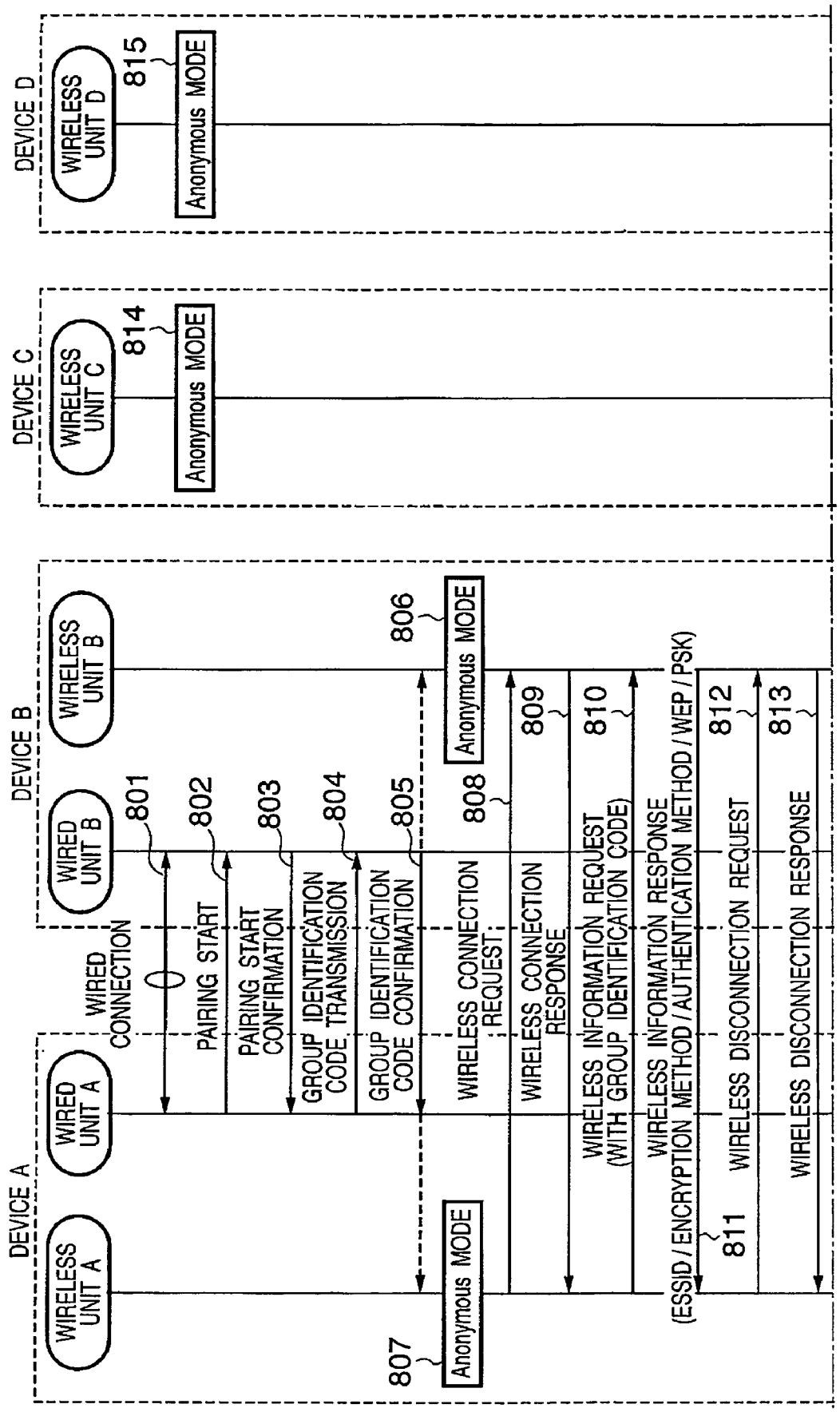

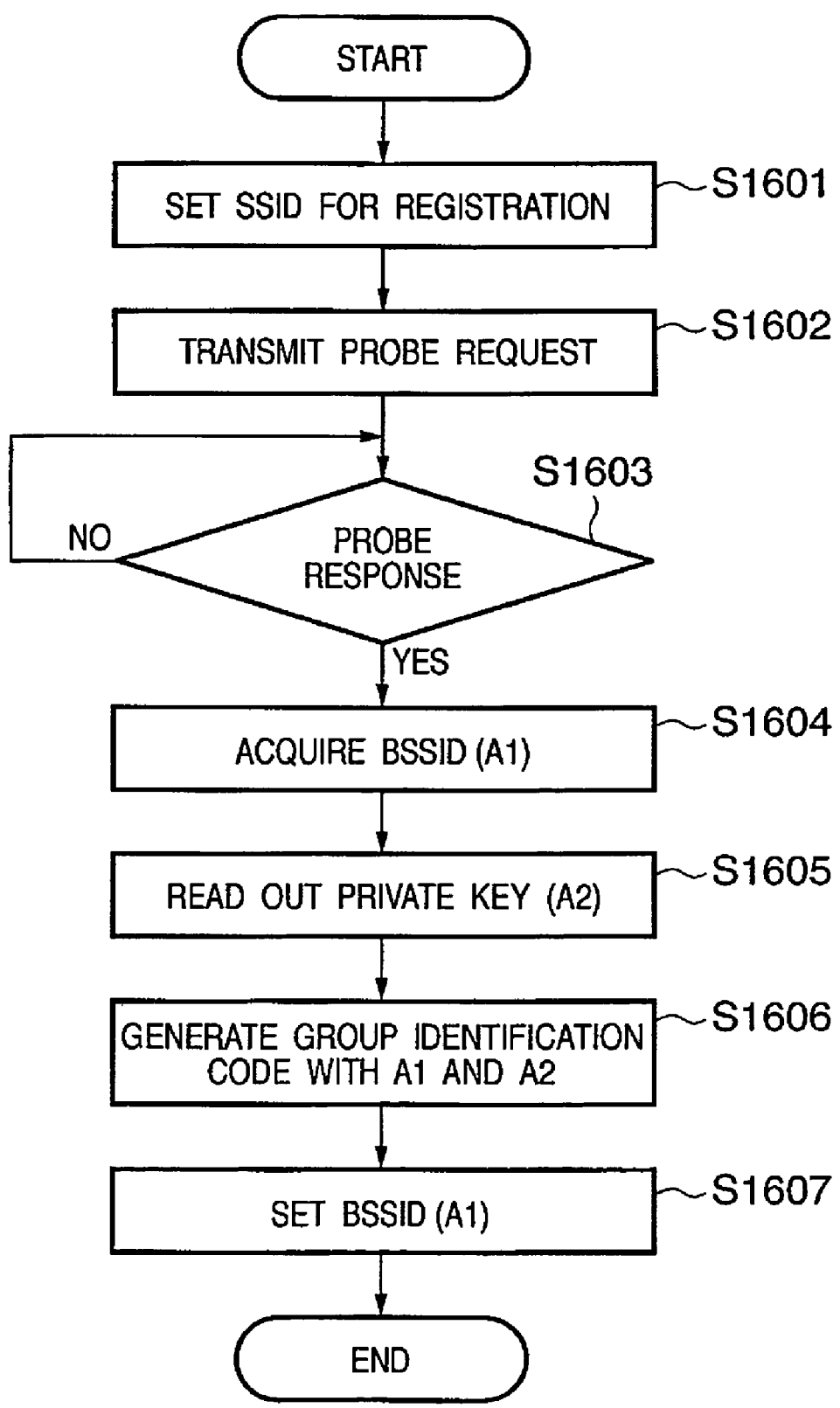

SETTING PARAMETERS IN A COMMUNICATION DEVICE FOR NETWORK CONNECTION

FIELD OF THE INVENTION

The present invention relates to a technique setting various kinds of parameters necessary for network connection in a communication device.

BACKGROUND OF THE INVENTION

With regard to communication parameter setting, the automation of parameter setting using an upper layer protocol is now underway in wired networks. For example, it is well known that a DHCP (Dynamic Host Configuration Protocol) server is used to provide an IP address solution for a device by automatically setting network parameters for the device. In addition, network parameters can be automatically set for the device by using a DNS (Domain Name Server) server to acquire the IP addresses of other devices.

In addition, a wireless network requires very complicated lower layer settings, which differ according to wireless communication methods, in addition to the use of the upper layer protocol in the wired network. The lower layer protocols are listed, for example, 802.11b, 802.11a, Bluetooth, WiMedia, Wireless USB, and Wireless 1394. Because of there are a plurality of wireless communication methods using the same frequency, and because authentication/encryption, reinforced for wireless communication, must be set in accordance with a network, the parameters to be set are varied. These parameter settings are still performed manually, often forcing a user to perform cumbersome operations.

According to the invention in U.S. Publication No. US2002/0147819A1 (Japanese Patent Laid-Open No. 2002-359623), relating to "wireless communication setting method", parameters required for communication using a given wireless communication method are set by using a communication different from the wireless communication. According to this arrangement, since parameters for the above wireless communication method are set by a communication based on another communication method, the user does not need to perform the setting by himself/herself. According to the arrangement disclosed in Japanese Patent Laid-Open No. 2003-218730, before setting the wireless information of a device, the network information (an ESSID, mode, and channel) is set, and wireless communication parameters to be generally used are set by using the set wireless network for registration.

The above prior art reduces cumbersome manual operations performed by a user. However, no solution is provided for the problem of security which is in a tradeoff relationship with cumbersome operations and the problem of expandability, e.g., simultaneous registrations of a plurality of wireless devices.

When, for example, wireless communication setting is to be performed by wired connection using the method disclosed in U.S. Publication No. US2002/0147819A1 (Japanese Patent Laid-Open No. 2002-359623), wired connection is performed between a given device and a device for which setting is to be performed, and identification associated with necessary wireless communication parameter setting can be completed (identification for one-to-one parameter setting). However, in order to also perform the wireless communication setting associated with other devices which are not connected by wire, identification for parameter setting must be repeatedly performed for each of them by connecting to them via wire. For this reason, when parameter setting is to be performed for many devices, it takes much time before completion.

When wireless parameter setting is to be performed upon shifting wireless parameter setting for a device in a specific registration mode, no method is currently available to discriminate a device for which wireless parameter setting is to be performed and other devices, as disclosed in Japanese Patent Laid-Open No. 2003-218730. For this reason, the parameter settings of the wireless communication could, in this case, be acquired by another device while spoofing without permission. Hence there is a risk of easily allowing wireless communication with malicious device in a subsequent steady state.

SUMMARY OF THE INVENTION

The present invention has been made in consideration of the above problems, and has as its object to easily set communication parameters between communication devices with safety in terms of security.

Another object of the present invention is to safely and quickly set communication parameters for three or more communication devices.

In order to achieve the above objects, according to one aspect of the present invention, there is provided a communication control method for communication between a first communication device and a second communication device through wireless communication means, comprising: a first notification step of notifying, from the second communication device, the first communication device of identification information by using another communication means other than the wireless communication means; an authentication step of executing wireless communication between the first communication device and the second communication device by using a first communication parameter shared in advance via the wireless communication means, performing authentication based on the identification information; a sharing step of sharing a second communication parameter to be set between the first communication device and the second communication device through the wireless communication in accordance with an authentication result obtained in the authentication step; and a setting step of setting, in the wireless communication means, a parameter for wireless communication between the first communication device and the second communication device by using the second communication parameter shared in the sharing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are flowcharts for explaining a communication sequence in device A according to the first embodiment;

FIGS. 8A and 8B are views showing a communication sequence between devices in the wireless communication system according to the second embodiment;

FIGS. 11A and 11B are flowcharts for device C and device D according to the second embodiment;

FIGS. 12A and 12B are views showing a communication sequence between devices in the wireless communication system according to the third embodiment;

FIG. 16 is a flowchart for the generation of a group identification code by device C or D.

DETAILED DESCRIPTION OF THE PREFERRED EMBODIMENTS

Preferred embodiments of the present invention will now be described in detail in accordance with the accompanying drawings.

First Embodiment

Figure 1:
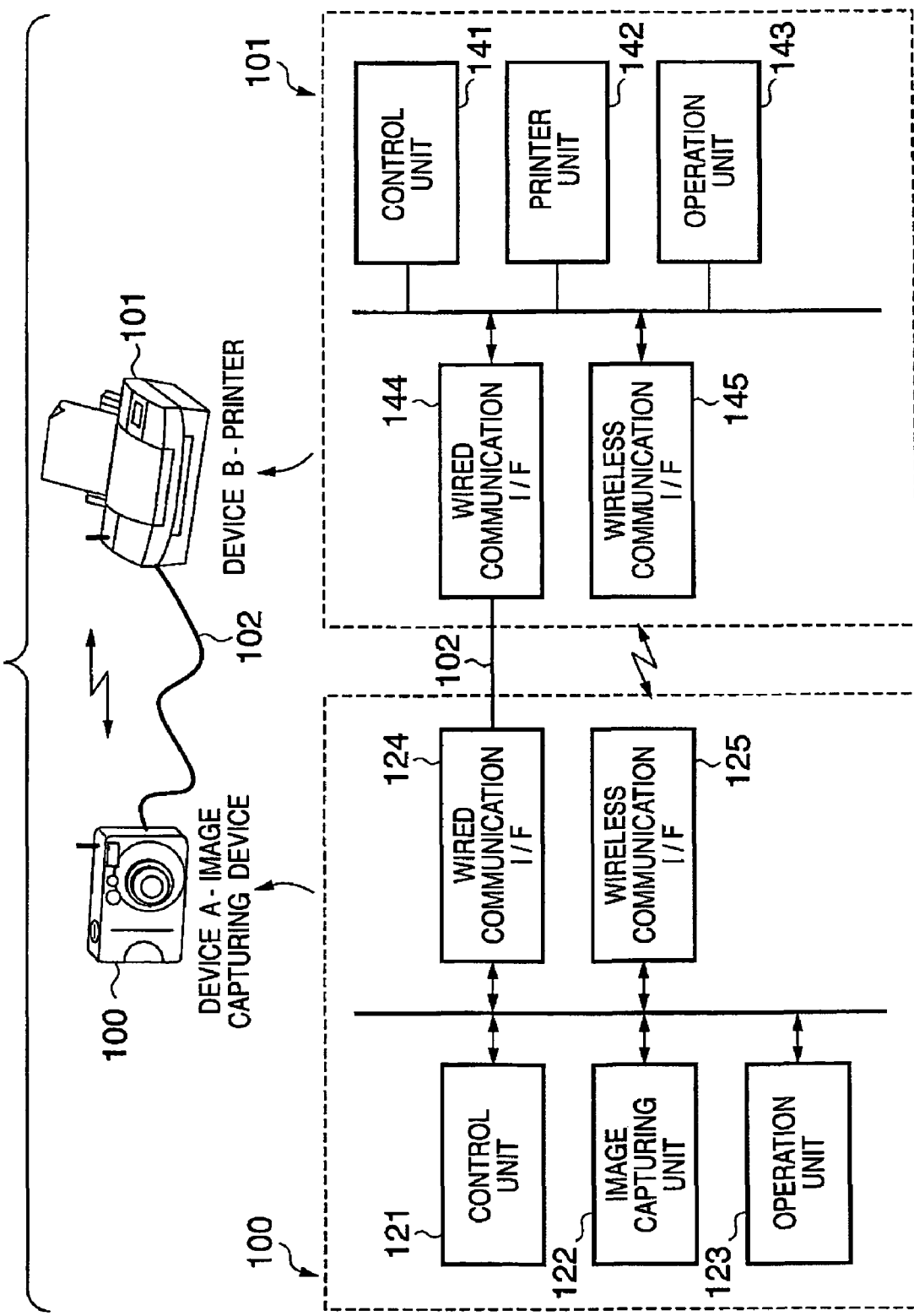
FIG. 1 is a view showing the arrangement of a wireless communication system according to the first embodiment.

FIG. 1 is a view showing the overall arrangement of a wireless communication system according to this embodiment. Referring to FIG. 1, an image capturing device 100 functions as the first wireless communication device according to the embodiment and has a wireless communication means. A printer 101 is a printer functioning as the second wireless communication device according to this embodiment. The image capturing device 100 and printer 101 can transmit/receive data including commands and captured images to/from each other by wireless communication based on the spread spectrum system such as wireless LAN communication based on IEEE802.11b standard. In addition, wired connection has been performed between the image capturing device 100 and the printer 101 by a wired cable 102 serving as the second communication means.

FIG. 1 shows an example of the hardware arrangements of the image capturing device 100 and printer 101. In the image capturing device 100, a control unit 121 controls an image capturing unit 122 and operation unit 123 in accordance with an operation instruction from the operation unit 123 by executing control programs stored in a memory (not shown). Control to be described later with reference to a flowchart is also executed by the control unit 121. The image capturing unit 122 includes a lens optical system and image sensing element. The operation unit 123 comprises various kinds of operation buttons and a display device (e.g., a liquid crystal panel). A wired communication I/F 124 realizes wired communication with an external device. A wireless communication I/F 125 realizes wireless communication with an external device.

In the printer 101, a control unit 141 drives a printer unit 142 to perform printout operation in accordance with an operation instruction from an operation unit 143 or data input from a host apparatus by executing the control program stored in a memory (not shown). Control to be described later with reference to a flowchart is also performed by the control unit 141. The printer unit 142 executes printing on a print sheet. The operation unit 143 comprises various kinds of buttons and a display device (e.g., a liquid crystal panel). A wired communication I/F 144 realizes wired communication with an external device. A wireless communication I/F 145 realizes wireless communication with an external device.

Figure 2:
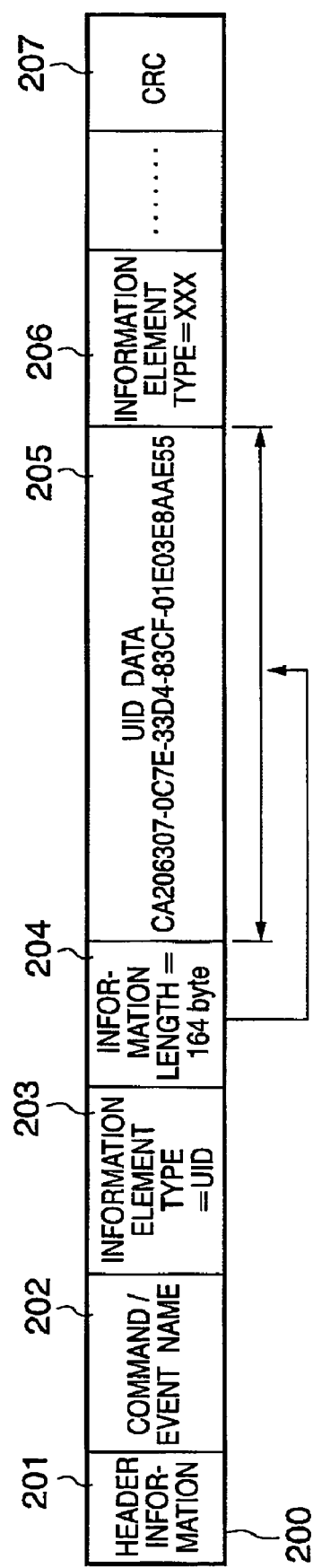
FIG. 2 is a view showing a frame format which is transmitted/received through wired communication between device A and device B according to this embodiment.

FIG. 2 is a view showing the frame format of data flowing on the wired cable 102 between the image capturing device 100 and the printer 101 when wireless communication parameters are to be set. A frame format 200 contains header information 201, a command/event name 202, information elements (203 to 205), and a CRC 207 serving as a checksum for data. The information elements include the information element type 203 (UID: unique identifier in FIG. 2), the information length 204 (16 bytes in FIG. 2), and the information content 205 (representing UID data: CA206307-0C7E-33D4-83CF-01E03E8AAE55 in FIG. 2. The second and subsequent information elements are written at and after "206" in the same arrangement.

Figure 3:
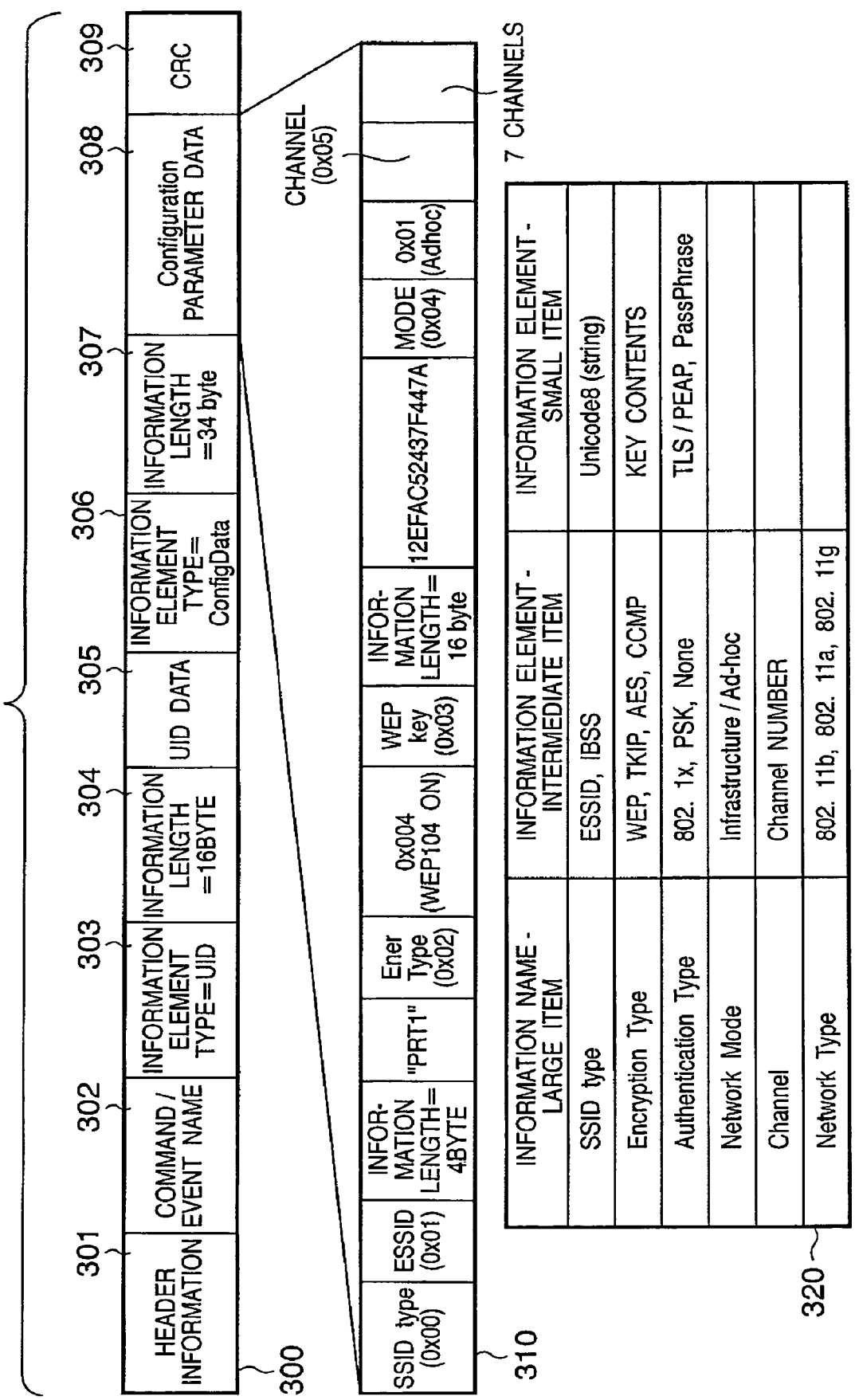
FIG. 3 is a view showing a frame format which is transmitted/received through wireless communication between device A and device B according to this embodiment.

FIG. 3 is a view showing the frame format of data flowing on a wireless communication channel between the image capturing device 100 and the printer 101 when wireless communication parameters are to be set. A frame format 300 includes header information 301, a command/event name 302, information elements (303 to 305 and 306 to 308), and a CRC 309 serving as a checksum for the frame. The information elements comprise the information element type 303 (UID: unique identifier in FIG. 3), the information length 304 (16 bytes in FIG. 3), and the information content 305 (UID data in FIG. 3). Likewise, the subsequent information elements include the information element type 306 (representing ConfigData in FIG. 3), the information length 307, and the information content 308 (Configuration Parameter Data in FIG. 3).

The detailed contents of the Configuration parameter data of the information content 308 are shown in a list 320, and specific values are shown as Configuration parameter data 310. The following are the setting contents of the Configuration parameter data 310 shown in FIG. 3. First of all, SSID type (0x00)=ESSID (0x01) has an information length of four bytes and a value "PRT1". Note that ESSID is a network identifier. Only WEP104 is ON when Encryption Type (0x02)=0x0004. A WEP key (0x03) comprises "12EFAC52437F447A" with a length of 16 bytes. In addition, network mode (0x04)=Adhoc (0x01) and channel (0x05)=7 are set.

Figure 4:
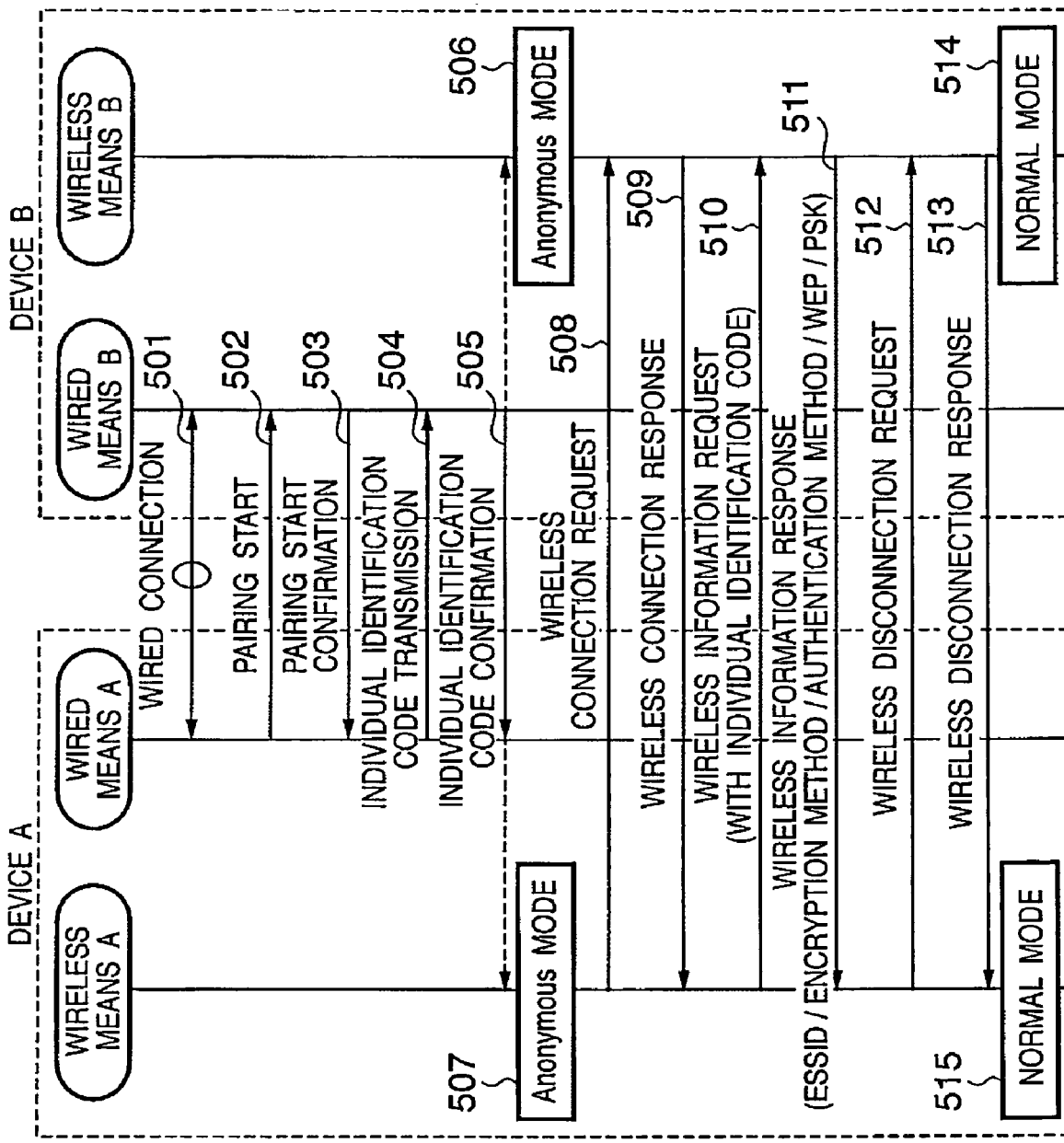
FIG. 4 is a view showing a communication sequence in device A and device B in the wireless communication system according to the first embodiment.

A sequence to be executed between device A (digital camera 100) and device B (printer 101) when wireless communication parameters are to be set will be described with reference to FIG. 4. FIG. 4 is a view showing a wireless communication parameter setting sequence in the first embodiment.

First of all, device A and device B establish wired connection between interfaces (the wired communication I/Fs 124 and 144) through wires A and B (501). In response to the detection of this wired connection as a trigger, device A issues a pairing start request to device B (502). Device B returns a pairing start confirmation to device A (503). Device A then transmits an individual identification code as a unique ID to device B (the transmission of the UID data 205 in FIG. 2) (504). Upon receiving the individual identification code, device B returns an individual identification code confirmation to device A (505). At the same time, device A and device B shift to the Anonymous mode (the mode of allowing unspecified persons to make connection) (506, 507). In this case, the Anonymous mode indicates that network information has been set by specific operation installed in the device in advance (wireless communication setting has been performed with communication parameters shared in advance). That is, the Anonymous mode in this case indicates a mode of allowing devices which can recognize specific operation to communicate with each other.

Wireless means A (wireless communication through the wireless communication I/F 125) which controls wireless connection of device A issues a wireless connection request to wireless means B (wireless communication through the wireless communication I/F 145) which controls wireless connection of device B (508). Wireless means B of device B transmits a wireless connection response as a response signal for the request to wireless means A of device A (509). Device A transmits, to device B (510), a wireless information request to which the individual identification code exchanged by the previous transmission/reception of the individual identification code (504, 505) is added. If the received individual identification code coincides with the individual identification code (504) previously sent from device A, device B returns a wireless information response containing parameters necessary for wireless connection (the Configuration parameter data 308 including an ESSID, encryption method, authentication method, and the like) (511). Device A transmits a wireless disconnection request to device B (512). Device B transmits a wireless disconnection response as a confirmation for the request to device A (513). Thereafter, device A and device B return to the normal mode (514, 515). Device A then performs wireless connection to device B by using the parameters acquired from device B, thereby starting communication in the normal mode.

The operations of device A and device B will be described in detail next with reference to the flowcharts of FIGS. 5A, 5B, 6A, and 6B and FIG. 4.

Figure 5A:
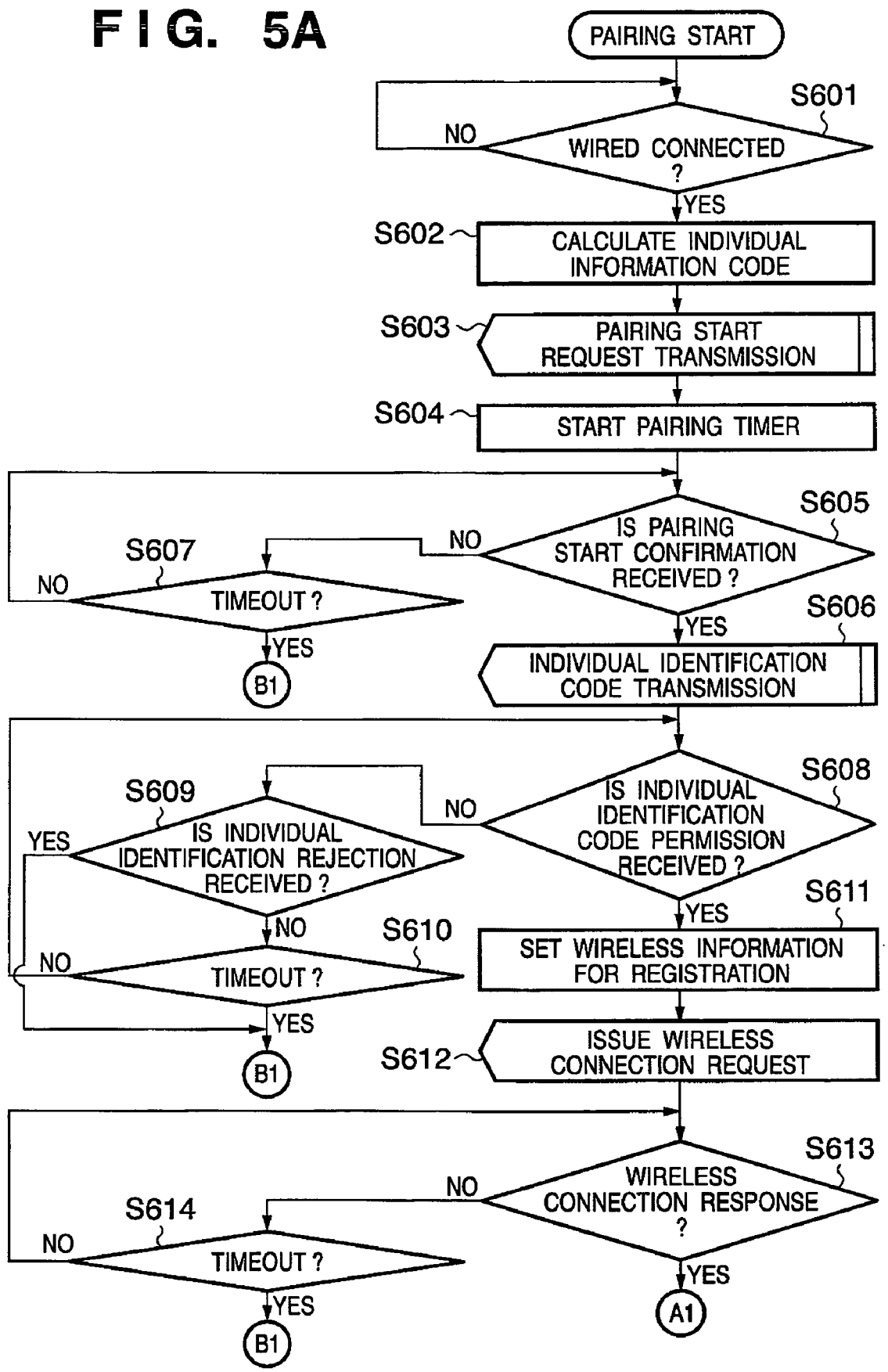

FIGS. 5A and 5B are flowcharts showing the operation of device A (digital camera 100) in the first embodiment in detail. Upon detecting wired connection, device A recognizes the start of pairing (step S601). When pairing starts, an individual identification code as a unique ID is calculated (step S602). This individual identification code is preferably a random number that can avoid collision with other devices at a probability of nearly 100%. For example, an individual identification code is calculated by using the MAC address of a wireless interface, a system clock at the corresponding time, or the like. In addition, as a method of generating individual identification codes, there is available a method of encrypting given identification code original data (the same for each system) as bases by using the same Pin Code (identification number) in accordance with the same algorithm in both devices, and using the results as individual identification codes. According to this method, both devices can check individual identification codes as well as authentication. This technique can prevent any device user who does not have the same Pin Code from performing pairing without permission. Device A then requests a remote device (to be referred to as device B hereinafter) in wired connection to start pairing (502) (step S603). At the same time, the pairing timer is started (step S604). While waiting for the reception of a response to the pairing start (pairing start confirmation (503)) from device B (step S605), device A checks the timeout of a pairing timer started in step S604 (step S607).

When receiving a pairing start confirmation from device B before the timeout, device A transmits the individual identification code as a unique ID which is calculated in step S602 (504, step S606). Until the timeout of the pairing timer occurs (step S610), device A waits for the reception of an individual identification code confirmation (steps S608 and S609). If device A receives an individual identification code confirmation before the occurrence of timeout and the confirmation is a permission for the individual identification code, device A sets the wireless communication unit (wireless communication I/F 125) of itself with wireless information for registration to set the Anonymous mode (steps S608 and S611, 507). Device A then transmits a wireless connection request by the wireless communication (step S612, 508). Until the timeout of the pairing timer occurs (step S614), device A waits for the reception of a wireless connection response (step S613).

When a wireless connection response is received before the occurrence of timeout (509), a wireless information request to which the individual identification code calculated at step S602 is added is transmitted (step S615, 510). Until timeout occurs (step S619), device A waits for a wireless information response (step S616). If a wireless information response is received before the occurrence of timeout (511), device A checks whether the individual identification code in the received frame coincides with the previous individual identification code (step S617). If they coincide with each other, wireless information is stored (step S618). Thereafter, device A issues a wireless disconnection request (step S623), and waits for a wireless disconnection response until the occurrence of timeout (steps S624 and S625). If a wireless disconnection response is received before the occurrence of timeout (513), wireless communication in the normal mode is started by using the wireless information stored in step S618 (step S626, 515).

Subsequently, the pairing timer is stopped (step S620), and information indicating a pairing success is displayed (step S621). When timeout occurs at each portion (step S607, S610, S614, S619, or S625) or an individual identification rejection is received (step S609), pairing failure display indicating that pairing has failed is displayed (step S622).

Figure 6A:
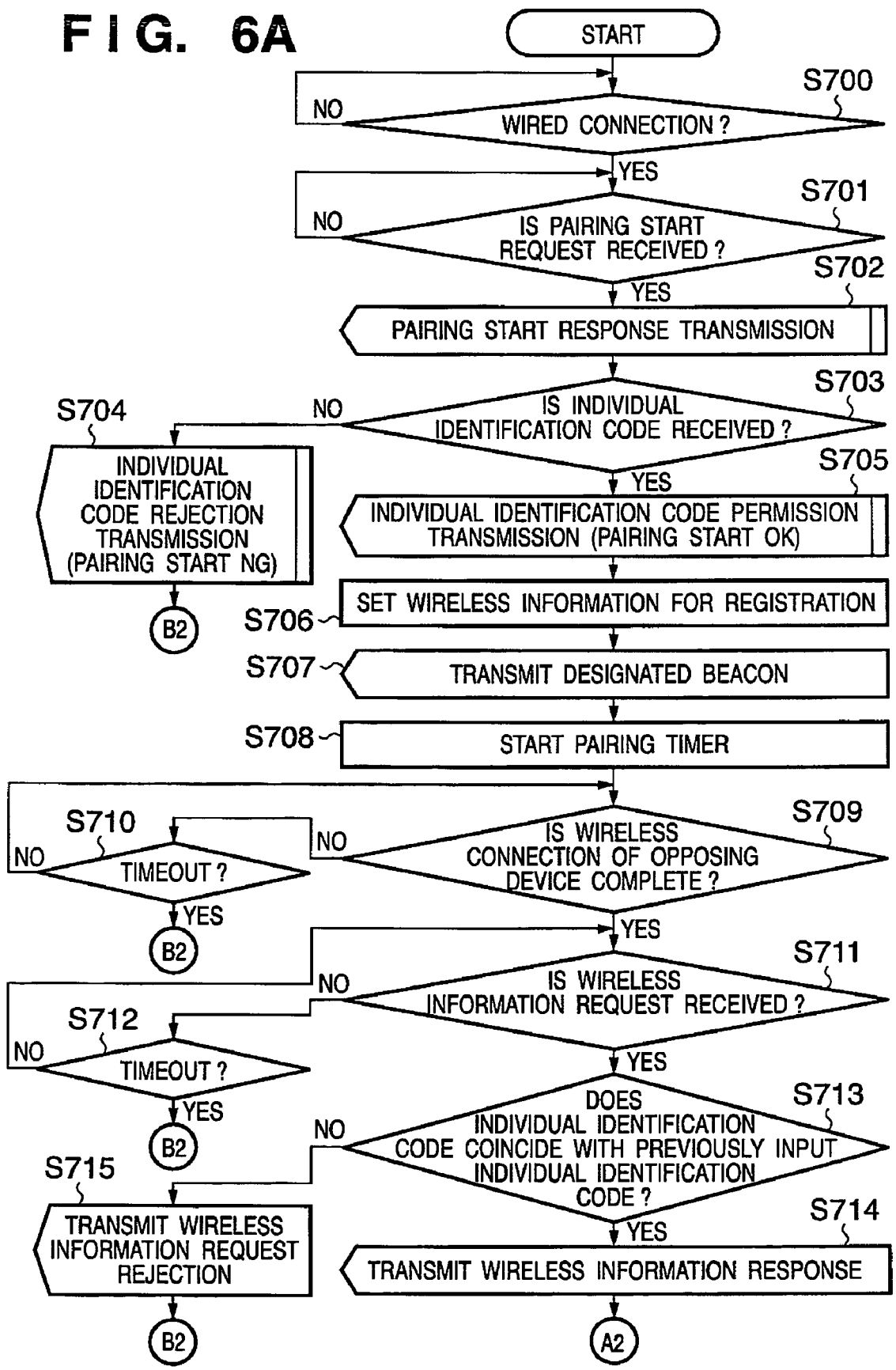
FIGS. 6A and 6B are flowcharts for explaining a communication sequence in device B according to the first embodiment.
Figure 6B:
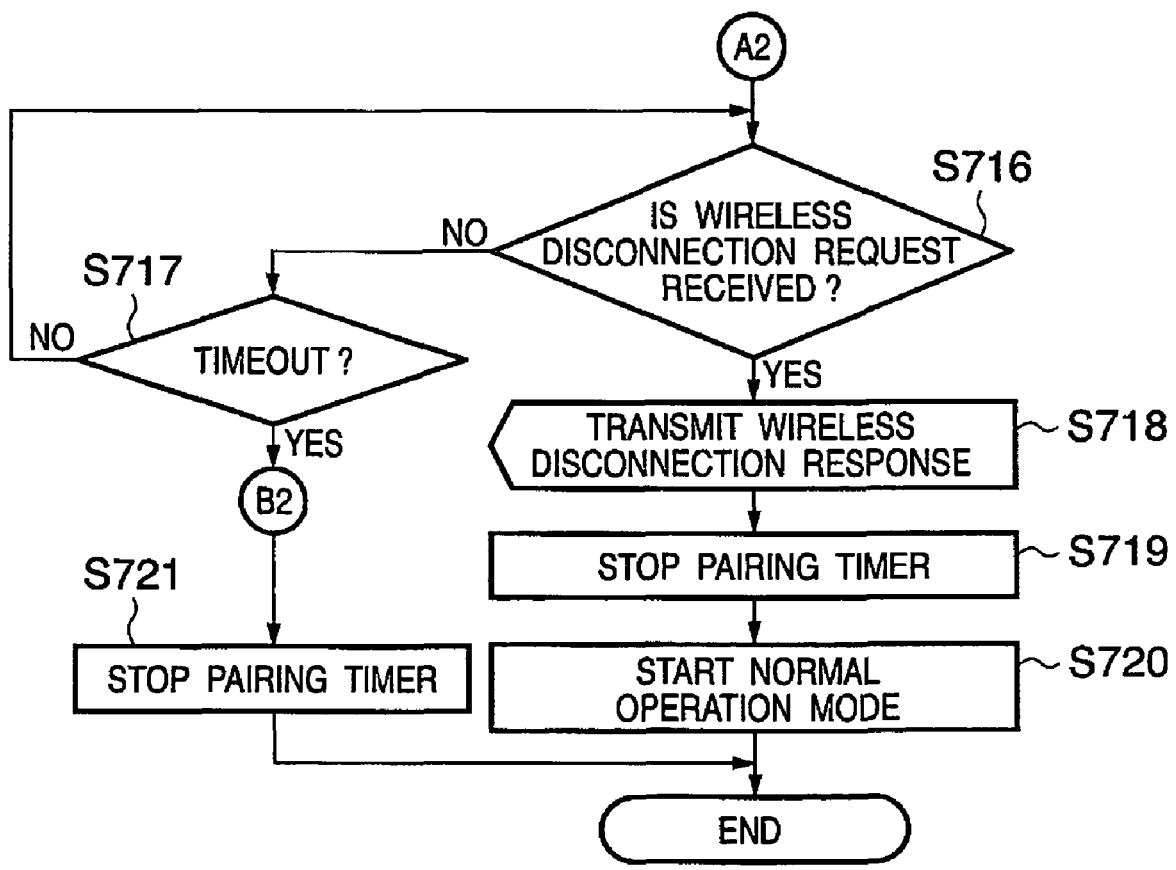

FIGS. 6A and 6B are flowcharts showing the operation of device B (printer 101) according to this embodiment in detail. When wired connection is detected (step S700), device B checks the reception of a pairing start request (step S701). Upon receiving a pairing start request (502), device B transmits a pairing start confirmation to the request source (device A) (step S702, 503). Upon receiving an individual identification code representing a unique ID by a wire from the request source (step S703, 504), device B checks whether the individual identification code is permitted, i.e., pairing can be started. If a pairing start is OK, device B transmits an individual identification code confirmation indicating a individual identification code permission (step S705, 505). If a pairing start is NG (rejected), device B transmits an individual identification code rejection (step S704).

Upon permitting a pairing start and transmitting an individual identification code confirmation, device B sets wireless communication in the Anonymous mode by setting wireless information for registration (step S706). The pairing timer is started (step S708) at the same time when the transmission of a designated beacon is started (step S707, 506). Until timeout occurs (step S710), device B waits for the completion of wireless connection to an opposing device (step S709). Note that when device B receives a wireless connection request from the opposing device (device A) and returns a wireless connection response in response to this (509), wireless connection is complete.

Upon confirming the completion of wireless connection to the opposing device before timeout, device B waits for the reception of a wireless information request (step S711) until the occurrence of timeout (step S712). Upon receiving a wireless information request before the occurrence of timeout (510), device B checks whether the individual identification code added to the wireless connection request coincides with the individual identification code received by previous wired connection (step S713). If they do not coincide, device B transmits a wireless information request rejection (step S715), and stops the pairing timer, thereby terminating this processing (step S721). At this time, device B may set MAC address filtering by using the MAC address contained in the wireless connection request and temporarily inhibit connection of the device. When the individual identification codes coincide with each other, device B transmits a wireless information response containing parameters required for wireless connection (the Configuration parameter data 308 including an ESSID as a network identifier, an encryption method to be used, an authentication method, and the like) (step S714, 511). Subsequently, until timeout occurs (step S717), device B waits for the reception of a wireless disconnection request (step S716). Upon receiving a wireless disconnection request before the occurrence of timeout (512), device B transmits a wireless disconnection response after the reception (step S718, 513), and stops the pairing timer (step S719), thereby shifting the operation to the normal operation mode and terminating this processing (step S720, 514). When timeout occurs at each portion (step S710, S712, or S717), device B stops the pairing timer and terminates this processing (step S721).

In the normal operation mode, normal wireless communication is performed between device A and device B in accordance with wireless information set by the above communication.

In the first embodiment, no information about the execution of processing such as special encryption is specified in association with wireless information (Configuration parameter data) transmitted in a wireless information response 512. However, encrypting the above wireless information in addition to comparison between individual identification codes makes it possible to prevent unauthorized access and tapping from other terminals.

As described above, according to the first embodiment, since device A acquires wireless communication setting parameters from device B by using wireless communication in the Anonymous mode, parameter setting operation can be simplified. In addition, in wireless communication in this Anonymous mode, device B can authenticate device A by using an individual identification code acquired by wired communication. This can prevent other devices from acquiring wireless setting information by spoofing, thereby maintaining security.

Second Embodiment

The second embodiment will be described next. The first embodiment has exemplified pairing of wireless information of device A and device B using individual identification codes. The second embodiment will exemplify a group pairing method which allows pairing of wireless information with other devices in addition to device A and device B by using group identification codes. Specific operation of an apparatus according to the second embodiment will be described below with reference to the configuration view of FIG. 7, the sequence chart of FIG. 8, and the flowcharts of FIGS. 9A, 9B, 10A, 10B, 11A and 11B.

Figure 7:
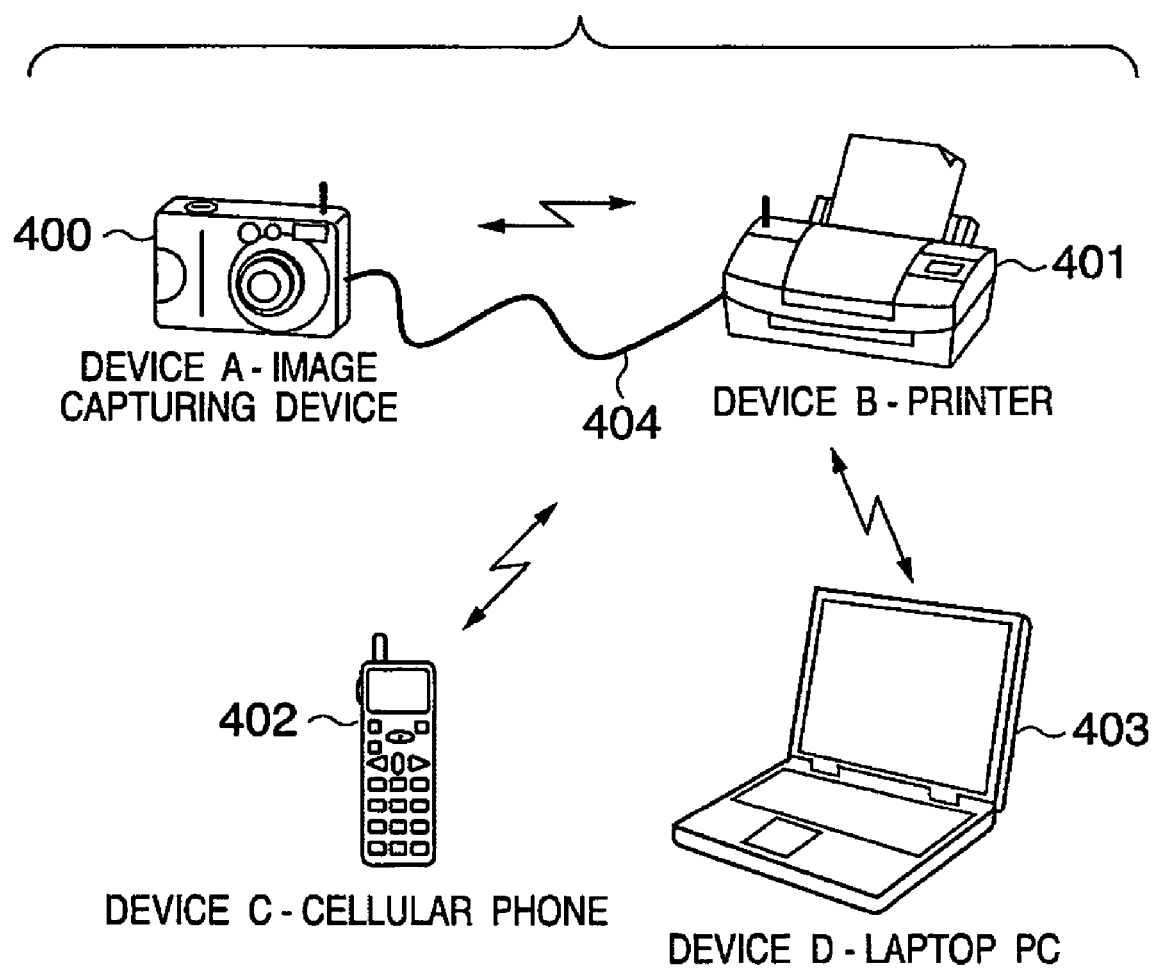
FIG. 7 is a view showing the arrangement of a wireless communication system according to the second to fourth embodiments.

FIG. 7 is a configuration view showing an overall wireless system according to the second embodiment. A device A (image capturing device) 400 and device B (printer) 401 are connected to each other through a wired cable 404. A device C (cellular phone) 402 and device D (laptop PC) 403 which can input identical group identification codes are in a state wherein group pairing can be done. Note that the arrangements of the image capturing device 400 and printer 401 are the same as those in the first embodiment (FIG. 1). In addition, since the arrangements of the cellular phone 402 and laptop computer 403 are known, an illustration thereof will be omitted. Assume, however, that they comprise programs which implement operations like those described with reference to FIGS. 8A, 8B, 11A and 11B.

FIGS. 8A and 8B are sequence chart showing the overall operation of the wireless system according to the second embodiment. The sequence in FIGS. 8A and 8B will be described below.

When device A (digital camera 400) is wired connected to device B (printer 401) (801), device A issues a pairing start request to device B (802). In response to this request, device B transmits a pairing start confirmation to device A (803). Device A then transmits a group identification code representing the same group to device B (804). Device B transmits a group identification code confirmation as confirmation information (805), and device A and device B shift to the Anonymous mode (806, 807).

Device A transmits a wireless connection request to device B (808), and device B transmits a wireless connection response as a response to the request (809). Device A then wirelessly transmits a wireless information request frame containing the group identification code previously transmitted by wired connection to device B (810). Device B compares the group identification code with the one previously received by wire. If they coincide with each other, device B transmits a wireless information response (Configuration parameter data 308 such as an ESSID, encryption method, and authentication method) to device A (811). Thereafter, device A transmits a wireless disconnection request (812). In response to this, device B returns a wireless disconnection response to device A (813). After the disconnection, device A shifts to the normal mode (830).

With respect to other devices C and D, wireless communication is started in the Anonymous mode in accordance with an instruction from the user (814, 815). Assume that the same group identification code as that previously transferred from device A to device B by wire is input and stored in each of devices C and D. Device C transmits a wireless connection request to device B (816). Device B transmits a wireless connection response to device C (817). Device C then transmits a wireless information request frame containing the previously input group identification code to device B (818). Device B compares the group identification code acquired from device A by wire with this group identification code. If they coincide with each other, device B transmits, to device C, a wireless information response containing the same parameter data as Configuration parameter data 308 transmitted to device A (819). Device C transmits a wireless disconnection request afterward (820), and device B returns a wireless disconnection response to device C in response to the request (821). Thereafter, device C shifts to the normal mode (823). Since the same flow of the sequence as that for device C is applied to device D, a description thereof will be omitted (824 to 829, 832). When a predetermined time elapses, device B also shifts to the normal mode (831).

Figure 9A:
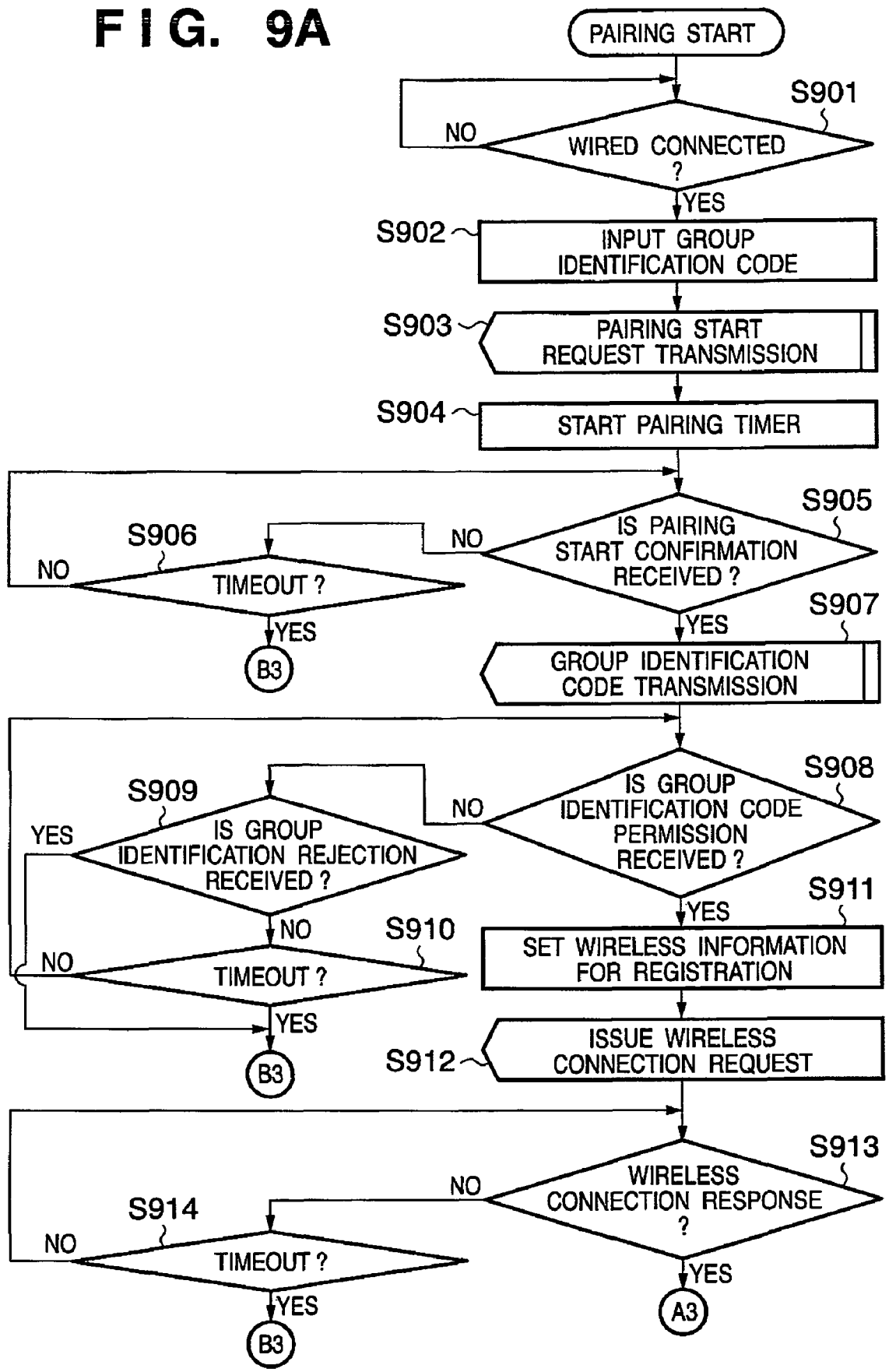
FIGS. 9A and 9B are flowcharts for explaining a communication sequence in device A according to the second embodiment.
Figure 9B:
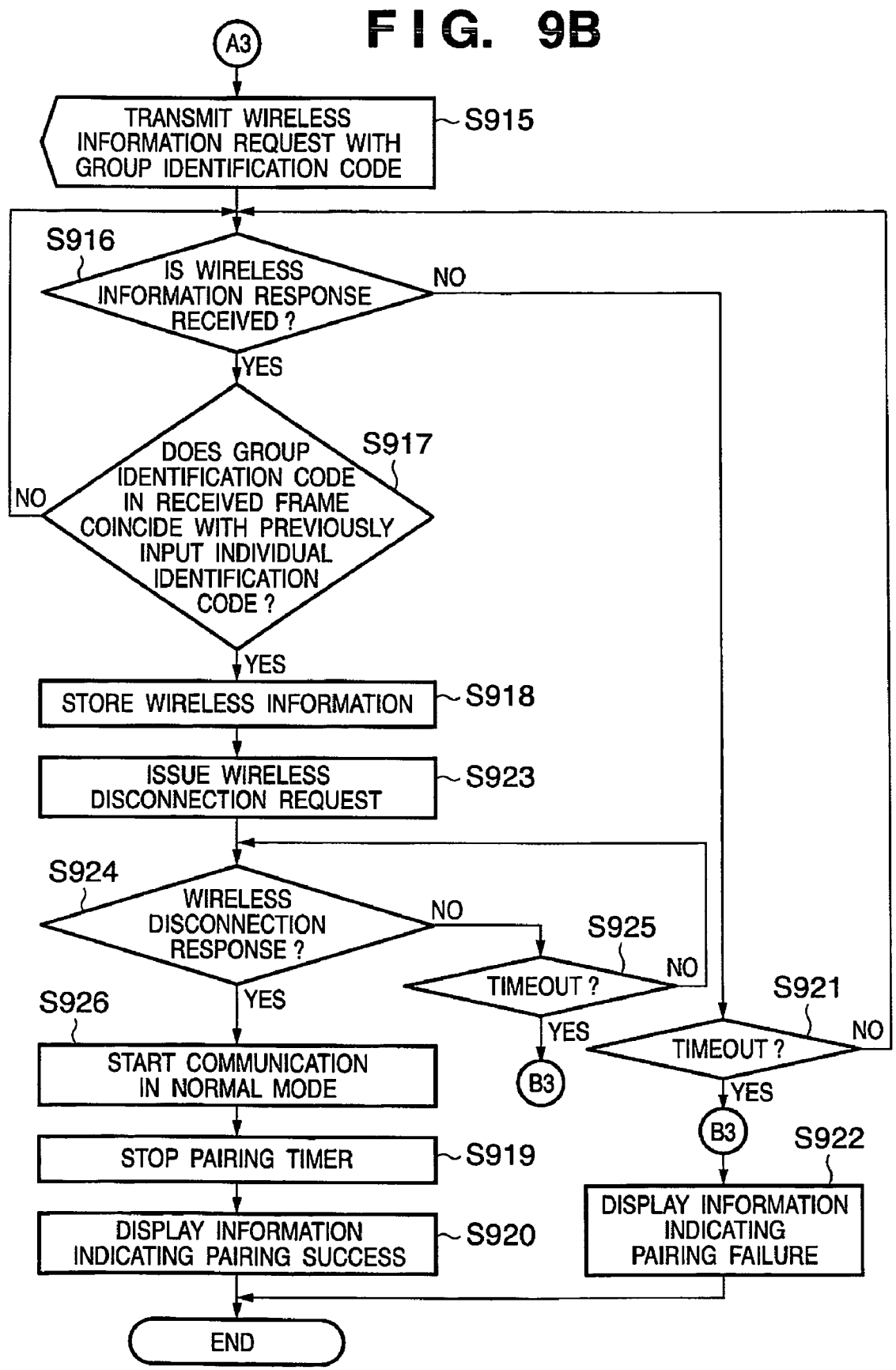

FIGS. 9A and 9B are flowcharts showing the detailed operation of device A according to the second embodiment. The operation of device A will be described in detail below with reference to FIGS. 9A and 9B.

Upon confirming that wired connection is established (step S901), the user is made to input a group identification code representing the unique ID of the group through a predetermined user interface (step S902). Alternatively, group identification information which is stored/held in advance may be read out from the memory. Device A transmits a pairing start request through the wired connection (step S903, 802). Device A starts the pairing timer (step S904), and waits for the reception of a pairing start confirmation (step S905) until the timeout of the pairing timer occurs (step S906). If a pairing start confirmation is received before the occurrence of timeout (803), the group identification code input in step S902 is transmitted through the wired connection (step S907, 804). Device A waits for the reception of a group identification code confirmation indicating a group identification code permission (step S908). If a group identification rejection is received (step S909) or timeout occurs (step S910), information indicating a pairing failure is displayed (step S922).

If a group identification code confirmation is normally received (805), wireless information setting (wireless information setting for Anonymous communication) for registration is performed (step S911), and a wireless connection request is wirelessly transmitted in the Anonymous mode (step S912, 808). Device A then waits for the reception of a wireless connection response from a remote device until the occurrence of timeout (steps S913 and S914). Upon receiving a wireless connection response (809), device A transmits a wireless information request containing the same group identification code as that transmitted through wired connection in step S907 (step S915, 810). Device A waits for the reception of a wireless information response (step S916) until the occurrence of timeout (step S921). Upon reception of a wireless information response before the occurrence of timeout (811), device A checks whether the group identification code in the received frame coincides with the previously input group identification code (step S917). If they coincide with each other, device A stores the wireless information contained in the wireless information response (step S918).

Device A issues a wireless disconnection request (step S923, 812), and waits for a wireless disconnection response until the occurrence of timeout (steps S924 and S925). Upon receiving a wireless disconnection response before the occurrence of timeout (813), device A starts communication in the normal mode by using the wireless information stored in step S918 (step S926, 830). Device A then stops the pairing timer (step S919) and displays information indicating a pairing success (step S920). If timeout occurs at each portion (step S906, S910, S914, S921, or S925), pairing failure display indicating that pairing has failed is performed (step S922).

Figure 10A:
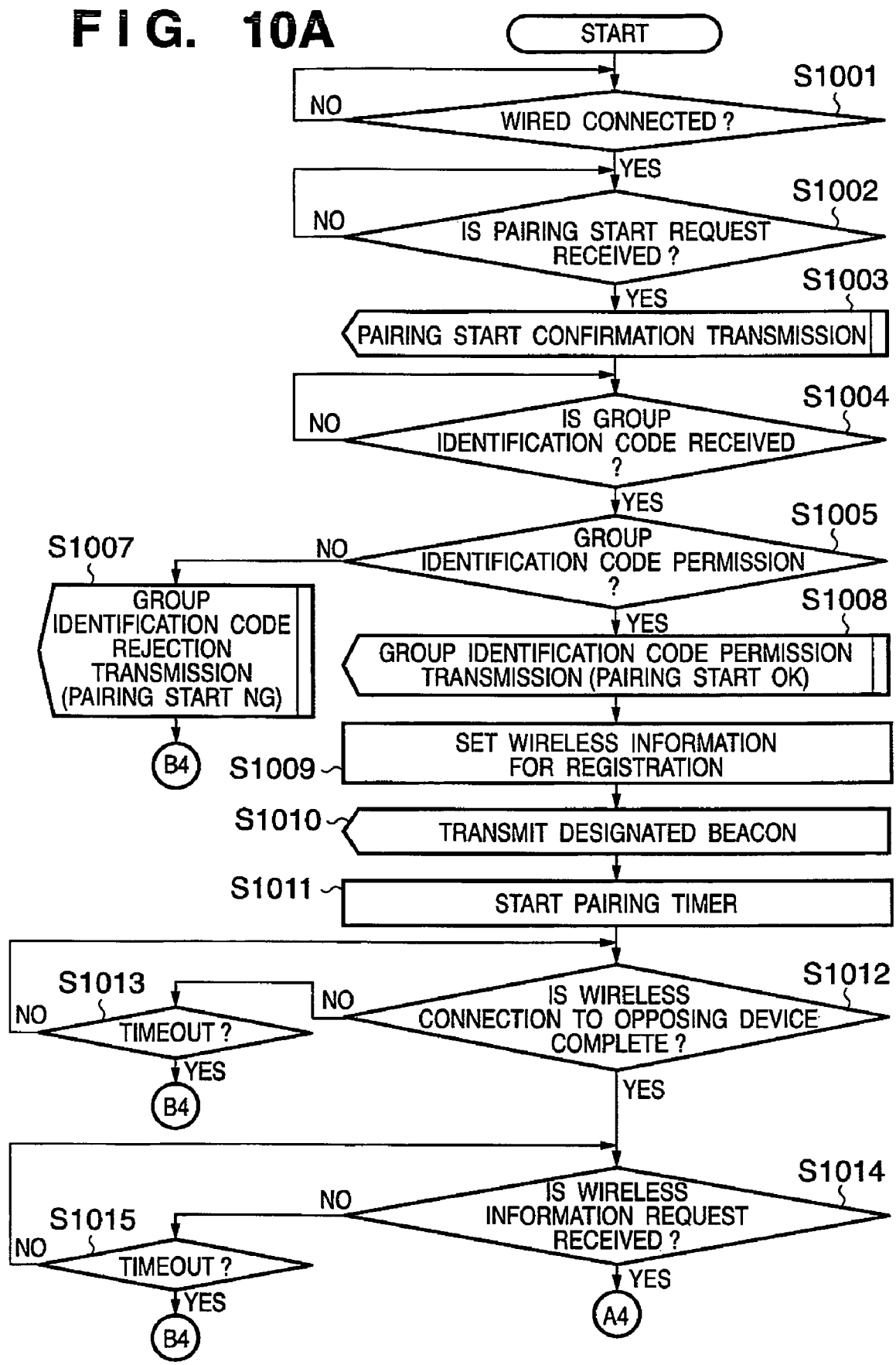
FIGS. 10A and 10B are flowcharts for explaining a communication sequence in device B according to the second embodiment.
Figure 10B:
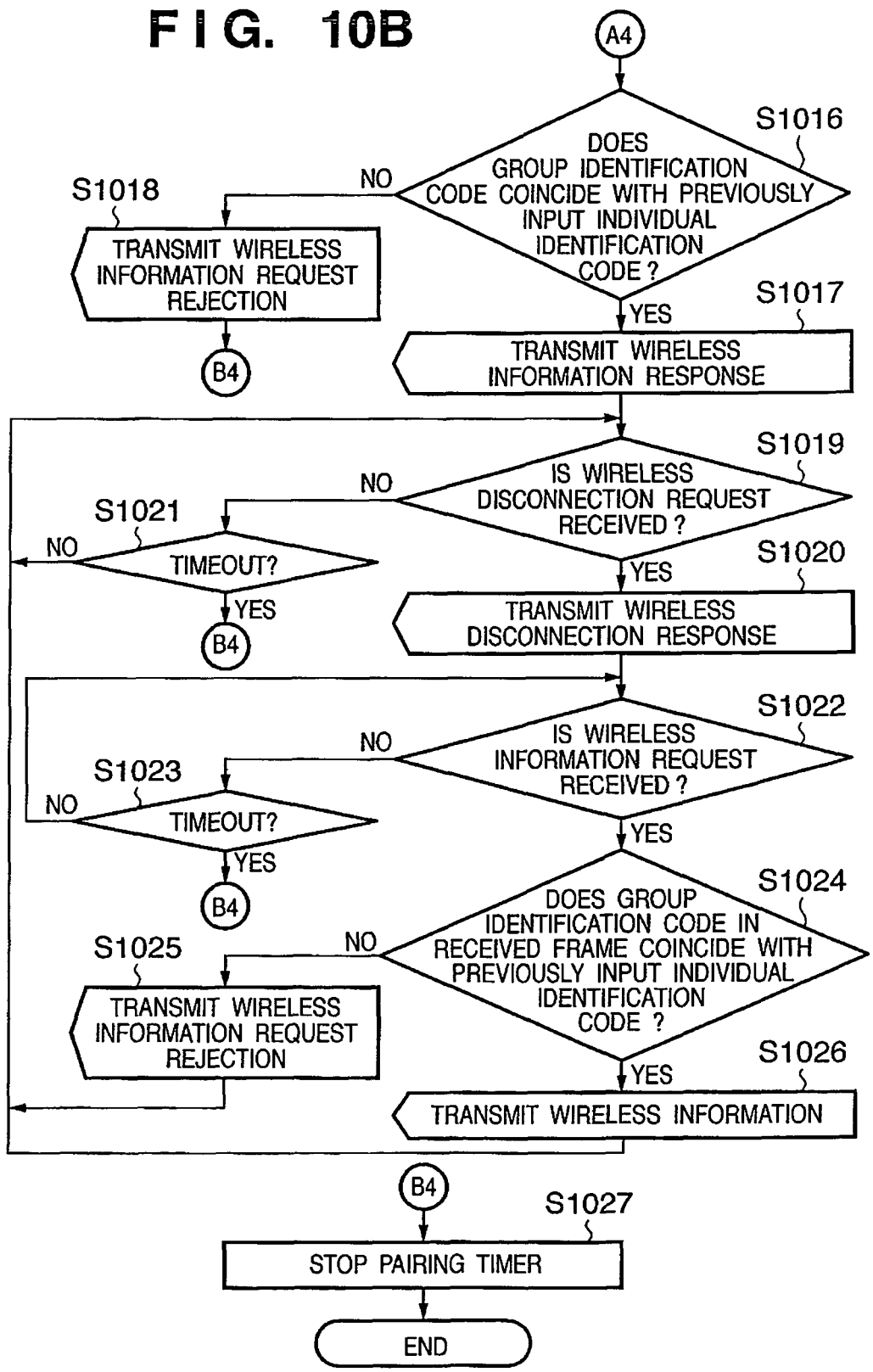

FIGS. 10A and 10B are flowcharts showing the detailed operation of device B in the second embodiment. The operation of device B will be described in detail below with reference to FIGS. 10A and 10B.

Device B checks whether wired connection has been performed (step S1001, 801). If wired connection has been performed, device B waits for the reception of a pairing start request from a remote device in this wired connection (device A) (step S1002). Upon receiving a pairing start request (802), device B transmits a pairing start confirmation (step S1003, 803). Then Device B waits for the reception of a group identification code representing the individual ID of a group through wired connection (step S1004). Then the Device B receives the group identification code (804), device B checks whether the group identification code is permitted (pairing is OK) (step S1005). If pairing is OK, device B transmits a group identification code permission as a group identification code confirmation (step S1008, 805). If pairing is to be rejected, device B transmits a group identification code rejection (step S1007), and stops the pairing timer, thereby terminating this processing (step S1007).

When pairing is permitted, device B sets wireless communication in the Anonymous mode by using wireless information for registration (step S1009, 806), and stars transmitting a beacon with designated wireless information (step S1010). At the same time, device B starts the pairing timer (step S1011). Device B then waits for information indicating the completion of wireless connection to an opposing device, which is transmitted wirelessly (step S1012), until timeout occurs (aperture stop S1013). Note that when device B receives a wireless connection request from the opposing device (device A) (812) and returns a wireless connection response in response to this request (813), wireless connection is complete.

If information indicating the completion of wireless connection is received before timeout, device B continuously waits for the reception of a wireless information request (step S1014) until timeout occurs (step S1015). Upon receiving a wireless information request before timeout, device B checks whether the group identification code added to the wireless information request coincides with the group identification code transmitted through the previous wired connection (step S1016). If they do not coincide with each other, device B transmits a wireless information request rejection (step S1018), and stops the pairing timer, thereby terminating this processing (step S1027). If they coincide with each other, device B transmits a wireless information response containing parameters necessary for wireless connection (the Configuration parameter data 308 such as an ESSID serving as a network identifier, encryption method to be used, and authentication method) (step S1017).

Device B then waits for the reception of a wireless disconnection request (step S1019) until the occurrence of the timeout of the pairing timer (step S1021). Upon receiving a wireless disconnection request (812), device B transmits a wireless disconnection response (step S1020, 813). Subsequently, device B checks the reception of a wireless information request from other devices (corresponding to devices C and D in this embodiment) (step S1022) until the occurrence of the timeout of the pairing timer (step S1023). Note that the reception of wireless information requests is performed through the reception of wireless connection requests from other devices (816, 824) and the transmission of responses (817, 825). Upon receiving a wireless information request (818, 826), device B checks whether the group identification code of the received frame coincides with the group identification code received from device A through wired connection (step S1024). If they coincide with each other, device B transmits a wireless information response containing the same parameter data as the Configuration parameter data 308 transmitted to device A (step S1026, 819, 827). If they do not coincide with each other, device B transmits a wireless information request rejection (step S1025). Upon receiving a wireless disconnection request from the corresponding device before the occurrence of timeout (step S1019, 820, 828), device B transmits a wireless disconnection response to the device (step S1020, 821, 829). Thereafter, the flow shifts the processing in step S1022 and subsequent steps.

If the occurrence of timeout is detected in step S1013, S1015, S1021, or S1023, the flow advances to step S1027 to stop the pairing timer (step S1026), thereby terminating this processing.

Figure 11B:
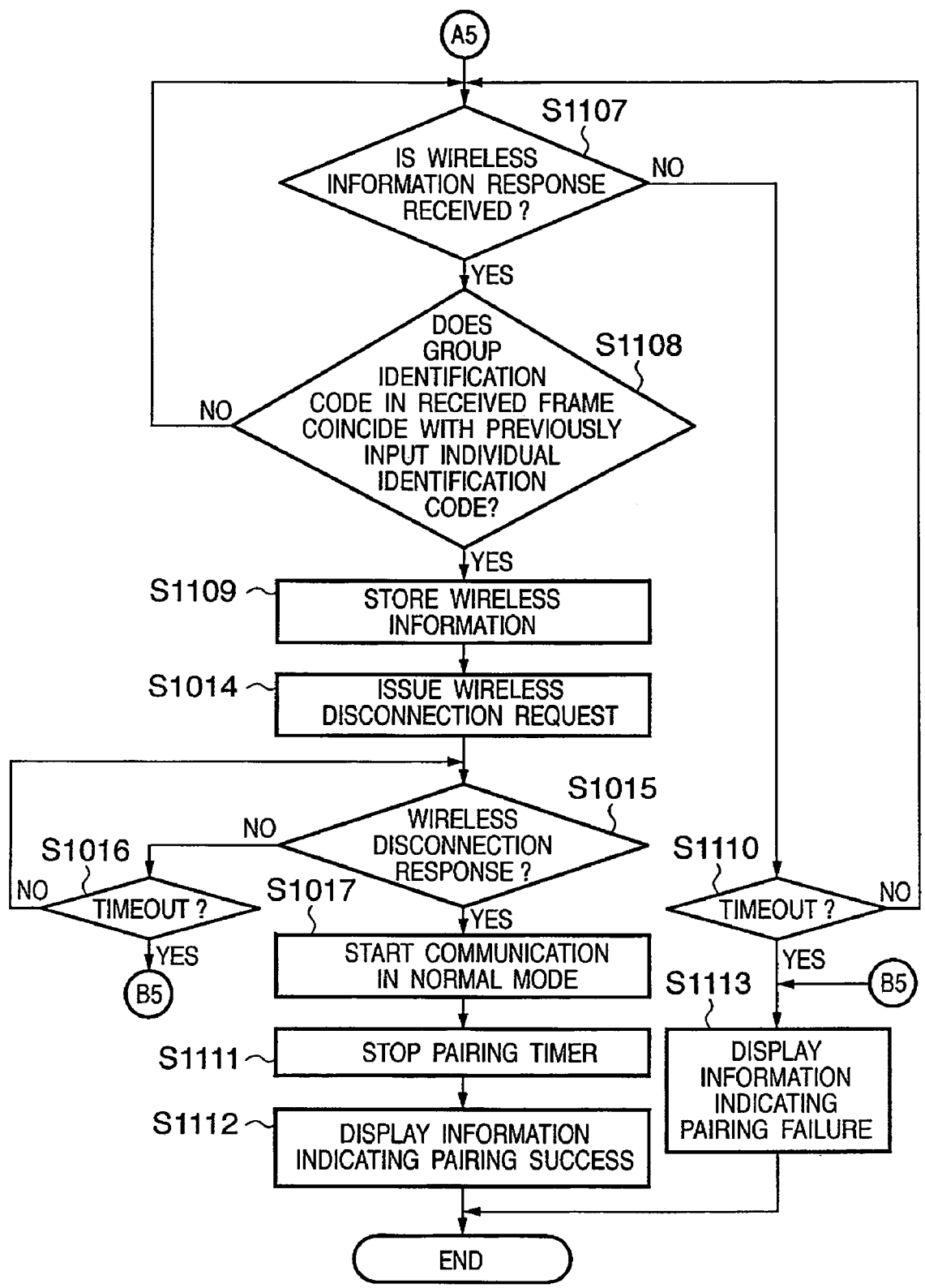

FIGS. 11A and 11B are flowcharts showing the detailed operation of device C and device D according to the second embodiment. The operation of device C and device D will be described below in detail with reference to FIGS. 11A and 11B.

When wireless communication in the Anonymous mode is instructed by user operation, device C or D is set in a state wherein the same group identification code as that used by device A is input, and inputs a group identification code by user operation (step S1100). Device C or D then sets wireless information for registration (step S1101, 814, 815), and starts the pairing timer (step S1102). Device C or D transmits a wireless connection request to device B (step S1103, 816, 824). Device C or D then waits for the reception of information indicating the completion of wireless connection (step S1104) until the occurrence of timeout (step S1106). Upon receiving information indicating the completion of wireless connection before the occurrence of timeout (817, 825), device C or D transmits a wireless information request containing a group identification code after the completion of connection (step S1105, 818, 826).

Device C or D then waits for the reception of a wireless information response from device B (step S1107) until the occurrence of timeout (step S1110). Upon receiving a wireless information response (819, 827) before the occurrence of timeout, device C or D checks whether the group identification code in the received frame coincides with the previously input group identification code (step S1108). If the group identification codes coincide with each other, the received wireless information is stored (step S1109). Thereafter, device C or D issues a wireless disconnection request (step S1014, 820, 828), and waits for a wireless disconnection response until the occurrence of timeout (steps S1015 and S1016). Upon receiving a wireless disconnection response before the occurrence of timeout (821, 829), device C or D starts communication in the normal mode by using the wireless information stored in step S1109 (step S1017, 831, 832).

Device C or D then stops the pairing timer (step S1111), and displays information indicating a pairing success (step S1112). If timeout occurs in step S1106, S1110, or S1016, information indicating a pairing failure is displayed (step S1113).

Figure 15:
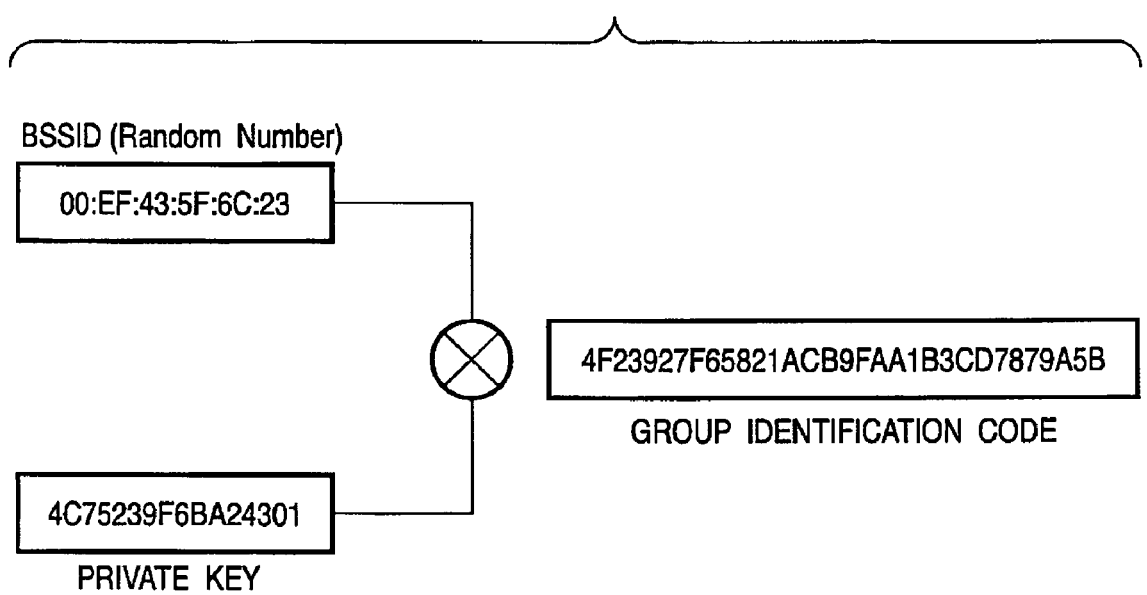
FIG. 15 is a view showing data as a seed (base information) for the generation of a group identification code and computation therefor.

According to the above description, it is assumed that the users of devices A, C, and D input group identification codes. However, group identification codes may be automatically generated to reduce the load on the users. A method of reducing the load on users will be described with reference to FIGS. 15 and 16. FIG. 15 is a view showing data as a seed (base information) for the generation of a group identification code and computation therefor. An adhoc network in a wireless LAN forms an IBSS (Independent Basic Service Set) as a network which requires no base station and comprises only terminal stations. In adhoc network connection, devices constituting an IBSS transmit a beacon to each other. In this description, a group identification code is calculated from a BSSID (Basic Service Set Identification) as information contained in this beacon and a private key commonly shared by the respective devices in advance. Note that a BSSID is the identifier of an adhoc network generated for each adhoc network connection.

Device A performs the following processing instead of the processing in step S902 described with reference to FIG. 9A. That is, when device A and device B are wired connected, device A determines a BSSID for the formation of an adhoc network in the Anonymous mode. Device A calculates a group identification code by performing predetermined computation for this BSSID and a private key shared by the respective devices. Referring to FIG. 15, a BSSID is randomly determined, and a group identification code is determined by multiplying the BSSID by a private key.

Subsequently, in step S903, device A sends a pairing start request to device B through wired connection. In step S904, the pairing timer is started. Upon receiving a pairing start confirmation from device B, device A transmits the calculated group identification code through wired connection (step S907). Device A waits for the reception of a group identification code confirmation indicating a group identification code permission (step S908).

Device A which has performed wireless information setting for registration and started operation in the Anonymous mode in step S911 transmits the determined BSSID upon containing it in a beacon, and becomes a creator for an adhoc network in the Anonymous mode.

Other processing in device A is the same as that described with reference to FIGS. 9A and 9B, and hence a description thereof will be omitted.

FIG. 16 is a flowchart for the generation of a group identification code by device C or D. The processing in FIG. 16 is executed instead of the processing in steps S1100 and S1101 described with reference to FIGS. 11A to 11C. Since the processing in device C is the same as that in device D, the processing in device C will be described below.

When wireless communication in the Anonymous mode is instructed by the user, device C sets an SSID as wireless information for registration (S1601), and transmits Probe Request (S1602). Since device A has already generated a network, device C receives Probe Response as a response to it (S1603). Device C extracts BSSID=A1 contained in received Probe Response (S1604). Device C reads out a private key A2 stored in advance (S1605), and performs computation with the above private keys A1 and A2 (FIG. 15) to generate the same group identification ID as that calculated by device A (S1606). Device C sets the BSSID acquired in step S1604 as a wireless parameter (S1607). That is, adhoc network setting is performed by using the SSID set in step S1601 and the BSSID set in step S1607 as parameters. The processings in step S1102 and subsequent steps in FIGS. 11A to 11C are started.

As described above, according to the second embodiment, group identification codes are transmitted/received by wired communication, and wireless setting information is exchanged. Setting information can also be exchanged, by using wireless communication in the Anonymous mode, with other devices which have the same group identification code but are not wired connected. This provides the effect of making parameter setting in wireless communication without cumbersome operation by a user.

In the second embodiment described above, there is no specific description about processing such as special encryption associated with wireless information (Configuration parameter data) in particular. Obviously, however, encrypting the above wireless information as well as comparing group identification codes can prevent unauthorized access and tapping from terminals other than those belonging to the group.

In addition, since the first and second embodiments mainly differ in only individual identification codes and group identification codes, there is provided a unique effect of implementing feature expansion up to group registration without any great change. Furthermore, generating a group identification code by using a random number (BSSID) generated every time a wireless network is formed makes it possible to provide a unique effect of eliminating the necessity to make a user input any complicated group identification code.

Third Embodiment

The third embodiment will be described next. The second embodiment has exemplified the group pairing method which can perform pairing of wireless information between device A and device B in addition to other devices using group identification codes. The third embodiment will exemplify a case wherein in addition to the execution of the above method, information indicating whether pairing has succeeded/failed is notified to device A having a means for displaying information indicating a pairing success/failure with respect to itself and other devices.

Figure 12B:
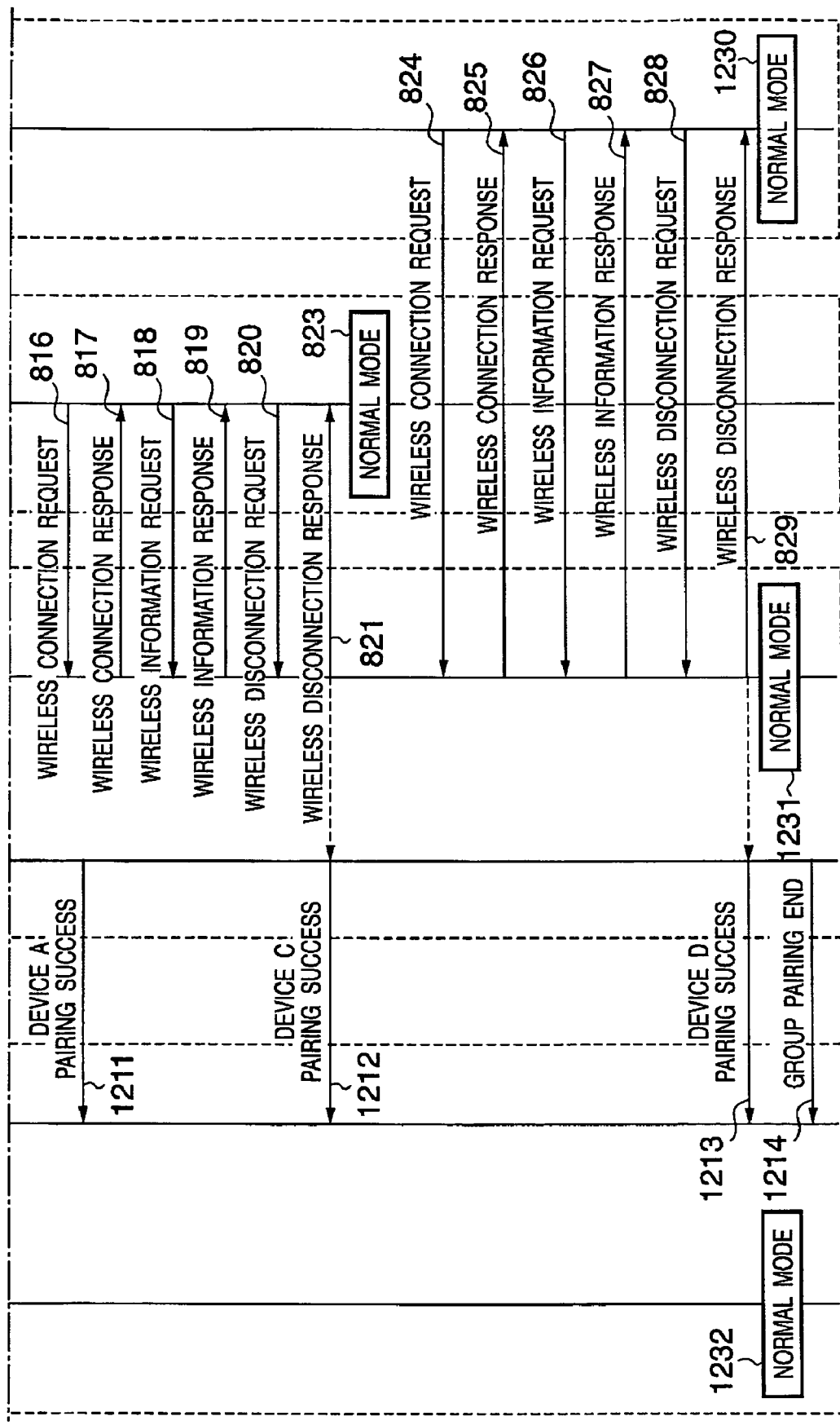

The specific operation of each device according to the third embodiment will be described in detail below with reference to the sequence charts of FIGS. 12A and 12B. Since a flowchart for the operation of each device is almost the same as in the second embodiment (FIGS. 9A, 9B, 10A, 10B, 11A and 11B), a flowchart for each device will be omitted here. The same reference numerals as in FIGS. 8A and 8B denote the same operations in FIGS. 12A and 12B, and a detailed description thereof will be omitted.

When device B transmits a wireless disconnection response to device A (813), device B transmits information indicating a pairing success for device A to device A by using wired connection (1211). Transmitting information indicating whether pairing has succeeded/failed by using wired connection instead of wireless connection makes it possible to reliably notify a remote device side of a cause of a pairing failure or the like. That is, information indicating a success can be reliably sent as long as it is transmitted by wire, even in a case wherein a radio wave condition abruptly deteriorates and it takes much time to communicate only a last signal representing a success even if transmission/reception and setting of wireless information for pairing itself have been performed.

When pairing succeeds in the exchange of information (816 to 821) between device B and other device C, device B transmits a wireless disconnection response to device C (821). In addition to transmitting this wireless disconnection response, device B transmits information indicating a pairing success for device C to device A through wired connection (1212). In response to the reception of the wireless disconnection response from device B, device C shifts to the normal mode (823). The same sequence as that for device C is applied to device D. When pairing succeeds, information indicating the success (pairing success for device D) is transmitted from device B to device A through wired connection (1213). Device B notifies device A of the end of group pairing upon timeout of pairing or the like by using wired connection (1214). Device B and Device A shift to the normal mode (1231, 1232).

Note that the above operation of device B is implemented by transmitting information indicating a pairing success for a corresponding device (a device to which a wireless disconnection response is transmitted) to device A after the transmission of a wireless disconnection response in step S1020 in the flowchart of FIG. 10B. When the pairing timer times out, device B stops the pairing timer in step S1027 and notifies device A of the end of group pairing.

Device A displays information about the pairing success terminal on the basis of the notification of the pairing success by performing the processing in steps S1303 to S1306 to be described later with reference to FIG. 13C in the fourth embodiment.

According to the third embodiment described above, device B can notify device A by wire whether pairing for the device B has succeeded and which other devices have succeeded in pairing. Therefore, device A can display such information on the display device, and hence can notify the user of the pairing condition in a way easy to understand.

Fourth Embodiment

The fourth embodiment will be described next. According to the third embodiment, in the group pairing method which allows pairing of wireless information with respect to not only device A and device B but also other devices by using group identification codes, the device B notifies information indicating a pairing success/failure as to itself and other devices is notified to device A having the display device. In addition to this, the fourth embodiment will exemplify a case wherein the maximum number of devices which can be registered as a group is set in advance. Note that the exchange of information between the respective devices in the system is the same as that in the third embodiment (FIGS. 12A and 12B), and hence its illustration and description will be omitted.

Figure 13A:
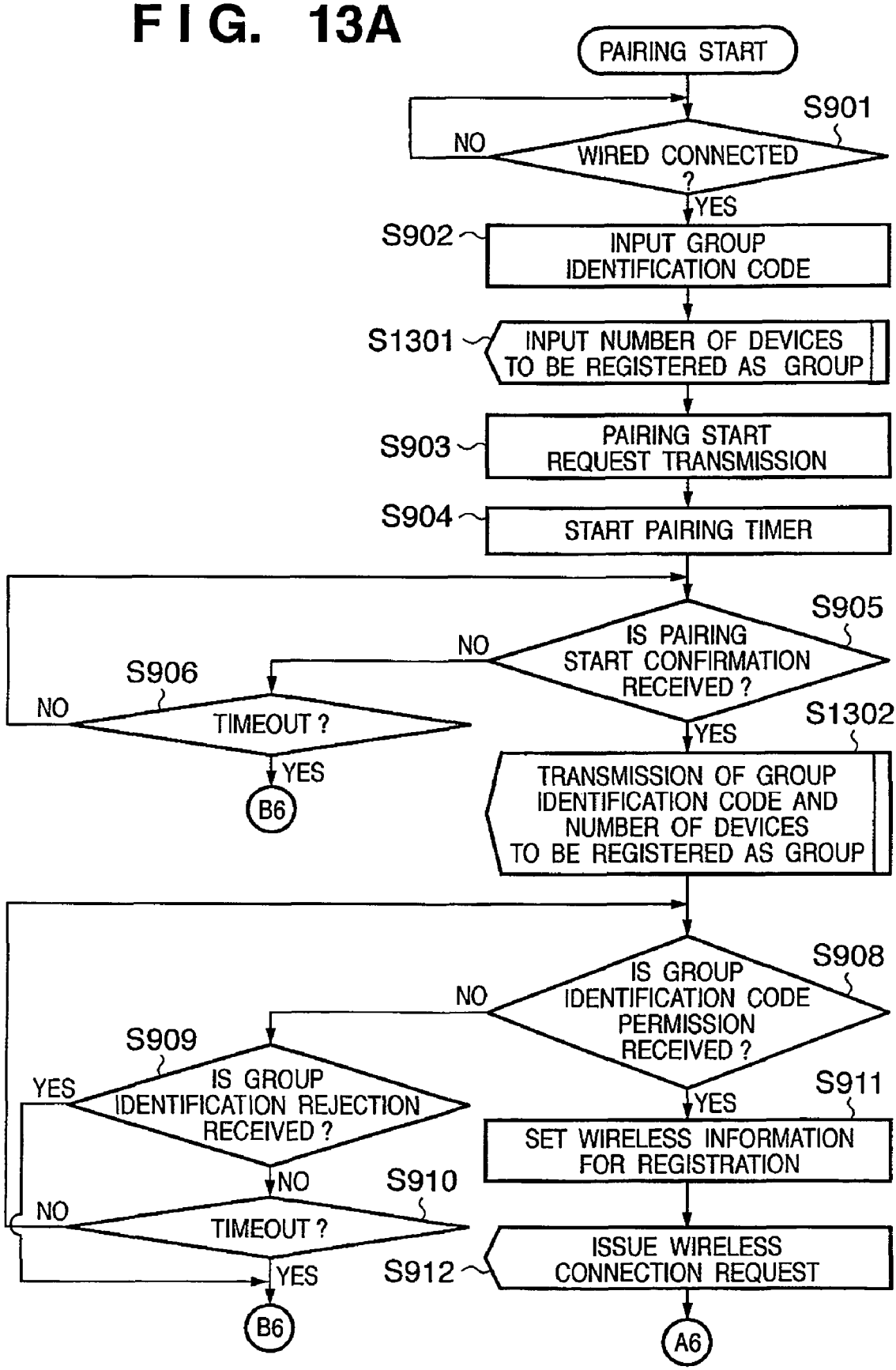
FIGS. 13A and 13C are flowcharts for explaining a communication sequence in device A according to the fourth embodiment.
Figure 13B:
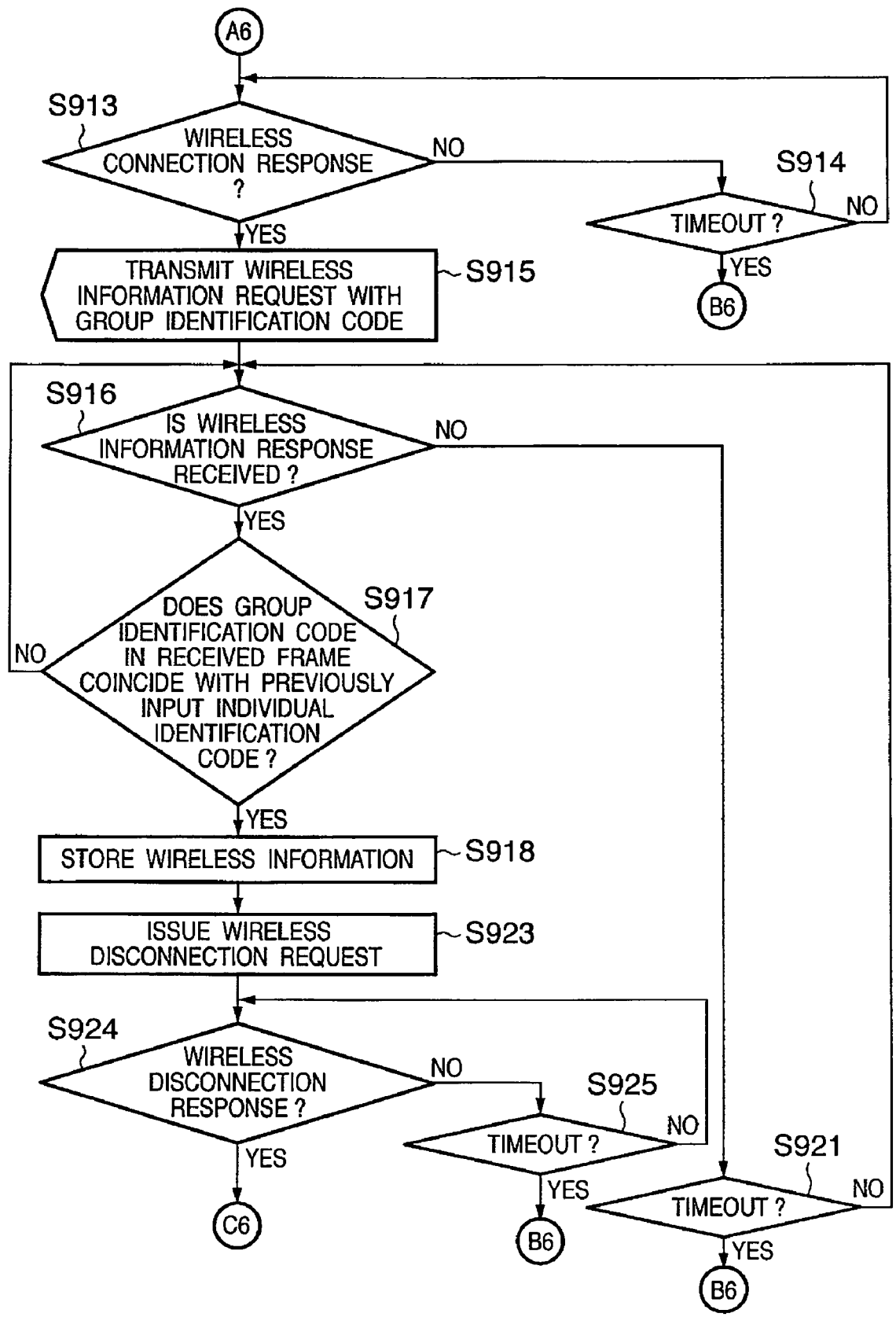
Figure 13C:
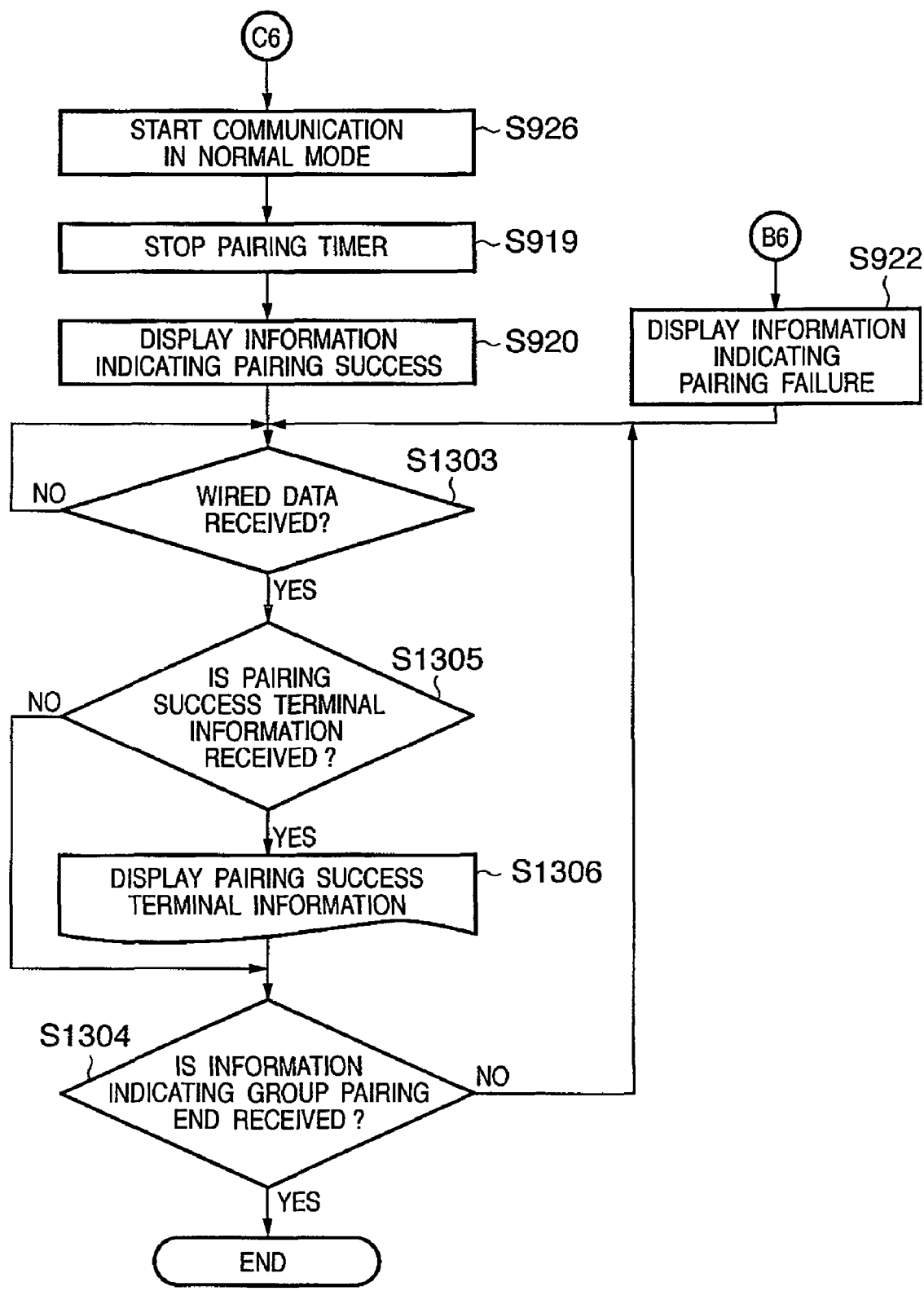

FIGS. 13A to 13C are flowcharts showing the detailed operation of device A in the fourth embodiment. The operation of device A will be described in detail below with reference to FIGS. 13A to 13C.

The same step numbers as in FIGS. 9A and 9B denote the same processing steps in FIGS. 13A to 13C, and a detailed description thereof will be omitted. In addition to the processing shown in FIGS. 9A and 9B, the flowcharts of FIGS. 13A to 13C include the registration of the number of devices as a group, the processing of notifying device B of the number of devices to be registered as a group (steps S1301 and S1302), and the processing of displaying on the basis of a notification indicating a pairing success (steps S1303 to S1305).

In the fourth embodiment, a group identification code is input (step S902), and the number of devices to be registered as a group is input (step S1301). Upon receiving a pairing start response (step S905), device A transmits the group identification code and the number of devices to be registered as a group to device B (step S1302).

After information indicating a pairing success between device B and device A is displayed (step S920) or information indicating a pairing failure is displayed (step S922), device A monitors data received through wired connection to check the pairing conditions of other devices (step S1303). Upon receiving pairing success terminal information (step S1305), device A updates the pairing success terminal information display (step S1306). This processing is repeated until the reception of information indicating the end of group pairing from device B (step S1304). Assume that in pairing success terminal information display in this embodiment, for example, the registered names of devices which have succeeded in pairing, which are contained in pairing success terminal information, are sequentially added to the list and displayed. If some terminals (including itself) have failed in pairing due to wireless interference or the like, automatic registration can be retried for only such failure terminals by using the same group identification code. In this case, displaying a list like that described above allows device A serving as a master device of the device group to grasp the progress of registration.

Figure 14A:
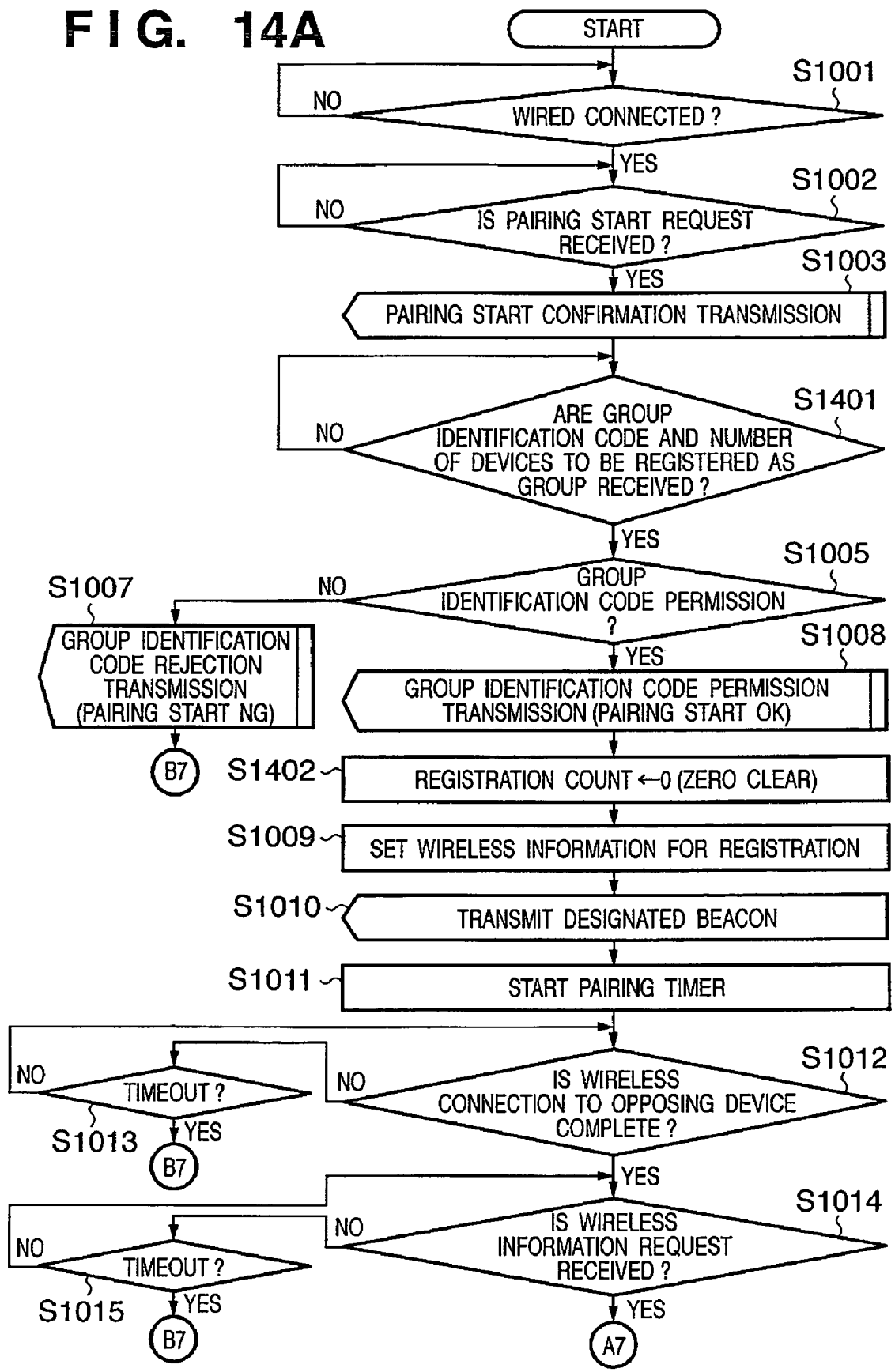
FIGS. 14A to 14C are flowcharts for explaining a communication sequence in device B according to the fourth embodiment.
Figure 14B:
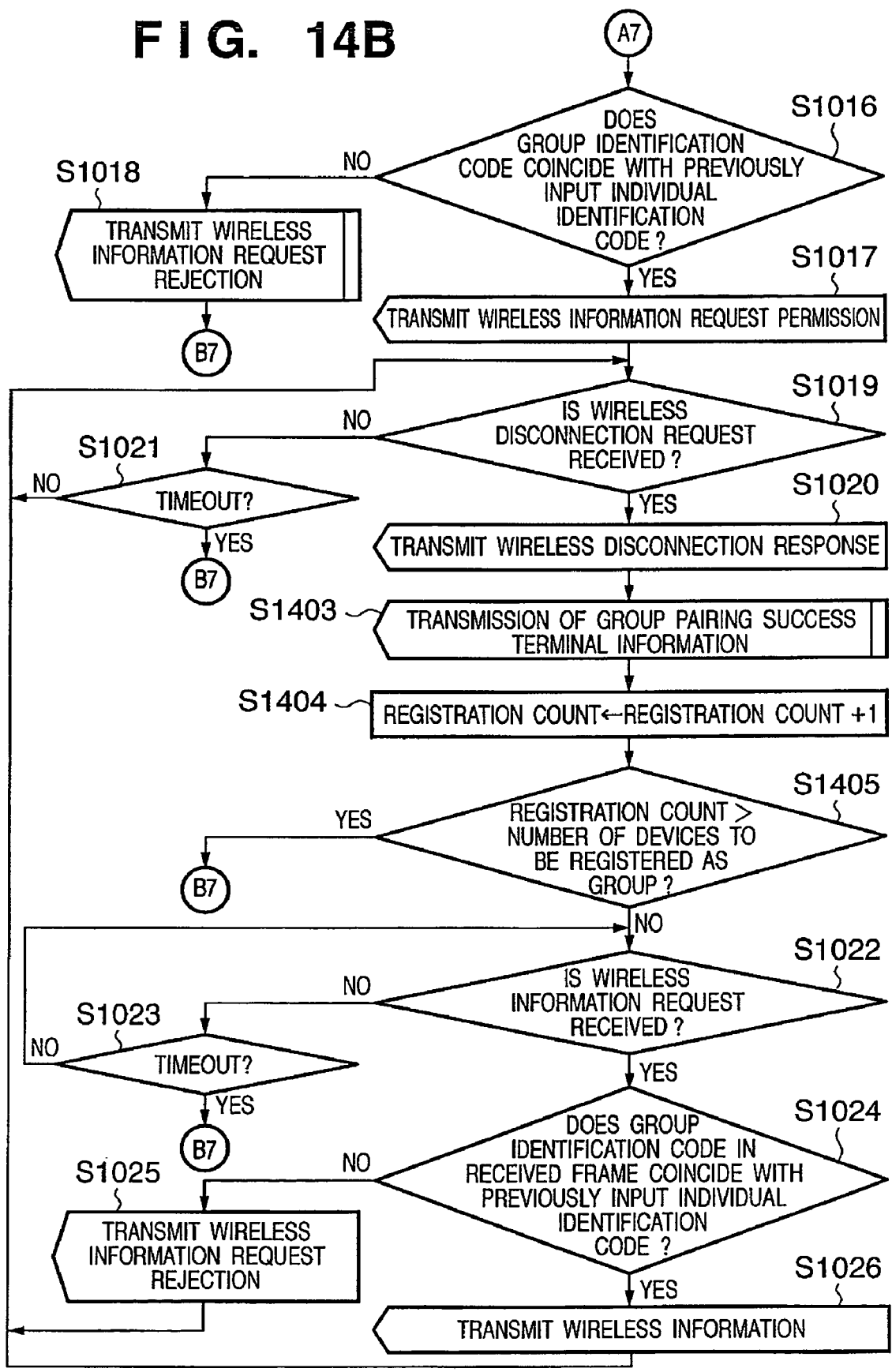
Figure 14C:
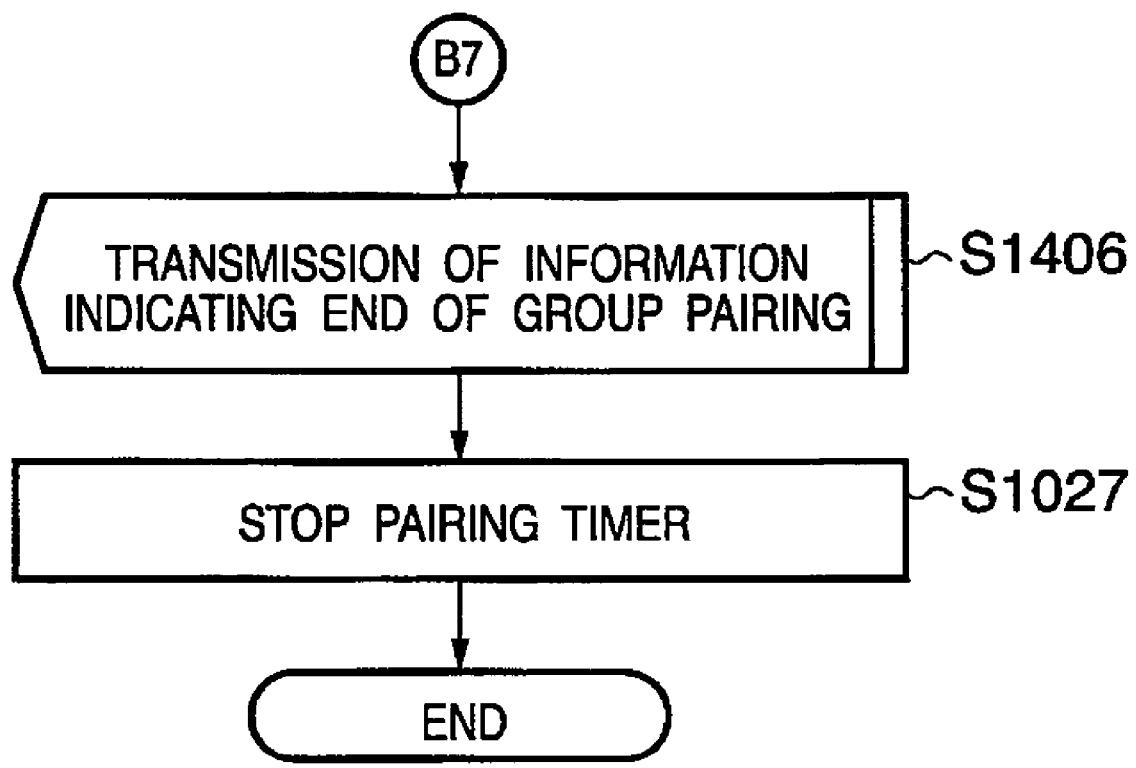

The operation of device B will be described next. FIGS. 14A to 14C are flowcharts for explaining the detailed operation of device B according to the fourth embodiment. The operation of device B will be described below with reference to FIGS. 14A to 14C. The same step numbers as in FIGS. 10A and 10B denote the same processing steps in FIGS. 14A to 14C, and a detailed description thereof will be omitted.

In the second embodiment (FIGS. 10A and 10B), device B waits for the reception of a group identification code in step S1004. In contrast, in the fourth embodiment, device B waits for the reception of a group identification code and the input number of devices to be registered as a group (step S1401). In addition, upon transmitting a group identification code permission in step S1008, device B clears a counter "registration count" for counting the number of devices to be registered as a group to 0 (step S1402).

If pairing with each device has succeeded, and a wireless disconnection response is transmitted in step S1020, device B transmits group pairing success terminal information indicating devices which have succeeded in the pairing through wired connection (step S1403). The counter "registration count" is incremented by one (step S1404). Device B then checks by comparison whether the registration count has exceeded the number of devices to be registered as a group whose reception is confirmed in step S1401 (step S1405). If the registration count has exceeded the number of devices to be registered as a group, device B transmits information indicating the end of group pairing to device A (step S1406), and stops the pairing timer (step S1027). If the registration count is less than the number of devices to be registered as a group, the flow advances to step S1022 and subsequent steps to perform pairing with other devices.

According to the fourth embodiment, device A transmits the maximum number of devices permitted to be registered as a group to device B in addition to an identification code unique to the group. This makes it possible to explicitly limit the number of devices to be registered.

Each embodiment described above is configured such that device A and device B exchange identification codes unique to the devices by using wired connection. However, near field communication connection may be used instead of wired connection between device A and device B. In the third and fourth embodiments, device B notifies device A of pairing successes for devices A, C, and D through wired connection. However, device B may wirelessly notify device A of such information. When notification is done through wired connection, a communication failure due to interference and the like can be prevented. In addition, notification through wired connection makes it possible to notify a cause of a pairing failure if it occurs.

The present invention incorporates a case wherein programs of software for implementing the functions of the embodiments described above (programs corresponding to the flowcharts shown in the accompanying drawings in the embodiments) are directly or remotely supplied to a system or apparatus to cause the computer of the system or apparatus to read out and execute the programs, thereby implementing the functions.

The program codes themselves which are supplied and installed in the computer to allow the computer to implement the functions/processing of the present invention also realize the present invention. That is, the computer programs themselves, which implement the functions/processing of the present invention, are also incorporated in the present invention.

In this case, each program may take any form, e.g., an object code, a program executed by an interpreter, and script data supplied to an OS, as long as it has the function of the program.

As a recording medium for supplying the programs, a floppy (registered trademark) disk, hard disk, optical disk, magnetooptical disk, MO, CD-ROM, CD-R, CD-RW, magnetic tape, nonvolatile memory card, ROM, DVD (DVD-ROM or DVD-R), or the like can be used.

In addition, methods of supplying the programs include the following. A client computer connects to a home page on the Internet by using a browser to download each computer program of the present invention itself from the home page or download a compressed file containing an automatic install function into a recording medium such as a hard disk. Alternatively, the programs can be supplied by dividing the program codes constituting each program of the present invention into a plurality of files, and downloading the respective files from different home pages. That is, the present invention also incorporates a WWW server which allows a plurality of users to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a home page through the Internet, executing the encrypted programs using the key information, and allowing a computer to install the programs.

The functions of the above embodiments are implemented not only when the readout programs are executed by the computer but also when the OS running on the computer performs part or all of actual processing on the basis of the instructions of the programs.

The functions of the above embodiments are also implemented when the programs read out from the recording medium are written in the memory of a function expansion board inserted into the computer or a function expansion unit connected to the computer, and the CPU of the function expansion board or function expansion unit performs part or all of actual processing on the basis of the instructions of the programs.

According to the present invention, communication parameters can be easily and safely set between communication devices. In addition, according to another aspect of the present invention, communication parameters can be safely and quickly set for three or more communication devices.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-336221 filed on Nov. 19, 2004 and Japanese Patent Application No. 2005-317117 filed on Oct. 31, 2005, which are hereby incorporated by reference herein.

What is claimed is:

1. A communication control method for a pairing process for communication between a first communication device and a second communication device through a wireless communication unit, comprising:

a first notification step of notifying, from the first communication device, the second communication device of authentication information through a direct communication path between the first communication device and the second communication device established by using another communication unit other than the wireless communication unit;

an establishing step of establishing a wireless network for sharing the network identifier, encryption method and authentication method between the first communication device and the second communication device by using said wireless communication unit;

an authentication step of performing the authentication process between the first communication device and the second communication device based on the authentication information, through the wireless network established in the establishing step;

a sharing step of sharing a communication parameter between the first communication device and the second communication device through the wireless network when authentication is successful in the authentication step; and a setting step of setting the communication parameter shared in the sharing step for wireless data communication, wherein the first communication device starts a first timer when the connection between the first communication device and the second communication device is established by using the another communication unit in said first notification step, the second communication device starts a second timer when the second communication device receives the authentication information by using the another communication unit in said first notification step, the first communication device terminates the pairing process in response to time up of the first timer, and the second communication device terminates the pairing process in response to time up of the second timer.

2. The method according to claim 1, further comprising a step of notifying, from the second communication device, the first communication device of a success of sharing communication parameter shared in the sharing step through the direct communication path.

3. The method according to claim 1, further comprising a detection step of detecting that the first communication device and the second communication device are connected to each other by said another communication unit, wherein the first notification step is activated upon detection of connection in the detection step.

4. The method according to claim 1, wherein said another communication unit uses one of a directly connected condition by wire and a connected condition using near field communication connection.

5. The method according to claim 1, wherein in the sharing step, the communication parameter is transmitted from the second communication device to the first communication device through the wireless network.

6. The method according to claim 5, wherein in the sharing step, the communication parameter is transmitted upon being encrypted.

7. The method according to claim 1, wherein the authentication information is group identification information by which a group to which the second communication device belongs is identified, and the method further comprises a transmission step of transmitting a communication parameter to another device which has requested the second communication device for the communication parameter by using the group identification information.

8. The method according to claim 7, wherein the transmission step is executed for a predetermined time limit.

9. The method according to claim 7, further comprising a second notification step of notifying the first communication device of a device to which the communication parameter is transmitted in the transmission step as a device which has succeeded in sharing the communication parameter.

10. The method according to claim 7, further comprising a counting step of counting the number of devices to which the communication parameter has been transmitted from the second communication device, wherein in the transmission step, processing is stopped when a counting result in the counting step exceeds a preset numerical value.

11. The method according to claim 7, wherein another device which has requested the second communication device for the communication parameter by using the group identification information has unit for automatically generating group identification information.

12. The method according to claim 1, wherein in the establishing step, the wireless network is established by setting another communication parameter shared in advance to said wireless communication unit and the method further comprises an another establishing step of establishing an another wireless network for wireless data communication by setting the communication parameter shared in the sharing step to said wireless communication unit.

13. A control method for pairing process performed by a communication apparatus including a wireless communication unit for performing wireless communication with an external device and another communication unit other than the wireless communication unit, comprising:

a sharing step of sharing authentication information with the external device by receiving the authentication information from the external device through a direct communication path between the communication apparatus and the external device established by using said another communication unit;

an establishing step of establishing a wireless network between said communication apparatus and external device by using said wireless communication unit;

an authentication step of authenticating the external device on the basis of the authentication information shared in the sharing step through the wireless network established in the establishing step;

a first transmission step of transmitting a communication parameter to the external device through the established wireless network when authentication is successful in the authentication step; and a communication control step of performing communication control for wireless data communication by using the communication parameter transmitted in the transmitting step, wherein a timer starts in response to reception of the authentication information in said sharing step, and the pairing process is terminated in response to time up of the timer.

14. The method according to claim 13, further comprising a step of transmitting information indicating a success of sharing the communication parameter to the external device through the direct communication path when transmission of the communication parameter is executed in the first transmission step.

15. The method according to claim 13, further comprising a detection step of detecting that the external device is connected by said another communication unit, wherein the sharing step is activated upon detection of connection in the detection step.

16. The method according to claim 13, wherein said another communication unit uses one of a directly connected condition by wire and a connected condition using near field communication connection.

17. The method according to claim 13, wherein in the first transmission step, the communication parameter is transmitted upon being encrypted.

18. The method according to claim 13, wherein
the authentication information is group identification information by which a group to which the external device belongs is identified, and
the method further comprises a second transmission step of transmitting a communication parameter to another device which has requested the communication parameter by using the group identification information.

19. The method according to claim 18, wherein the second transmission step is executed for a predetermined time limit.

20. The method according to claim 18, further comprising a notification step of notifying the external device of a device to which the communication parameter is transmitted in the second transmission step as a device which has succeeded in sharing the communication parameter.

21. The method according to claim 18, further comprising a counting step of counting the number of devices to which the communication parameter has been transmitted from the communication apparatus, wherein in the second transmission step, processing is stopped when a counting result in the counting step exceeds a preset numerical value.

22. A non-transitory computer readable medium having stored thereon a control program for causing a computer to execute the communication control method defined in claim 13.

23. The method according to claim 13, wherein in the establishing step, the wireless network is established by setting another communication parameter shared in advance to said wireless communication unit and the method further comprises an another establishing step of establishing an another wireless network for wireless data communication by setting the communication parameter transmitted in the transmitting step to said wireless communication unit.

24. A control method for pairing process by a communication apparatus including a wireless communication unit for performing wireless communication and another communication unit other than the wireless communication unit, comprising:
a sharing step of sharing authentication information with an external device by transmitting the authentication information to the external device through a direct communication path between the communication apparatus and the external device established by using said another communication unit;
an establishing step of establishing a wireless network between said communication apparatus and the external device by using said wireless communication unit;
a transmission step of transmitting the authentication information to the external device for authentication by the wireless network established in the establishing step;
a receiving step of receiving a communication parameter from the external device through the established wireless network when authentication is successful; and
a setting step of setting the communication parameter received in the receiving step for wireless data communication,
wherein a timer starts in response to establishment of the direct communication path in said sharing step, and the pairing process is terminated in response to time up of the timer.

25. The method according to claim 24, further comprising a display step of displaying information indicating a success of sharing the communication parameter when the communication parameter is received in the receiving step.

26. The method according to claim 24, further comprising a step of receiving information indicating whether sharing of the communication parameter has succeeded or failed with respect to an external device through the direct communication path.

27. A non-transitory computer readable medium having stored thereon a control program for causing a computer to execute the communication control method defined in claim 24.

28. The method according to claim 24, wherein in the establishing step, the wireless network is established by setting another communication parameter shared in advance to said wireless communication unit, and the method further comprises an another establishing step of establishing an another wireless network for wireless data communication by setting the communication parameter shared in the sharing step to said wireless communication unit.

29. A communication system which performs a pairing process for wireless communication between a first communication device and a second communication device, comprising:
a wireless communication unit configured to allow wireless communication between the first communication device and the second communication device;
another communication unit other than said wireless communication unit, which allows a direct communication between the first communication device and the second communication device;
sharing unit configured to cause the first communication device and the second communication device to share authentication information by notifying, from the first communication device, the second communication device of authentication information through the direct communication path between the communication apparatus and the external device established by using said another communication unit;
establishing unit configured to establish a wireless network for communicating a communication parameter between the first communication device and the second communication device by using said wireless communication unit;
a first timer which is started by the first communication device when said sharing unit establishes the connection between the first communication device and the second communication device;
a second timer which is started by the second communication device when the second communication device receives is notified of the authentication information;
authentication unit configured to perform authentication process based on the authentication information between the first communication device and the second communication device through the established wireless network;

a communication unit configured to cause the first communication device and the second communication device to communicate the communication parameter through the established wireless network when authentication is successful by said authentication unit, wherein the first communication device terminates the pairing process in response to time up of the first timer, and the second communication device terminates the pairing process in response to time up of the second timer.

30. A communication apparatus for performing a pairing process, which includes a wireless communication unit for performing wireless communication and another communication unit other than the wireless communication unit, comprising:

- a reception unit configured to receive authentication information from an external device through a direct communication path between the communication apparatus and the external device established by using said another communication unit;
- a timer which starts in response to reception of the authentication information by said reception unit;
- an establishing unit configured to establish a wireless network with the external device by using said wireless communication unit;
- an authentication unit configured to perform authentication using the authentication information received by said reception unit through the wireless network established by said establishing unit;
- a sharing unit configured to share a communication parameter with the external device when authentication is successful by said authentication unit, wherein the pairing process is terminated in response to time up of said timer.

31. A communication apparatus for pairing process, including a wireless communication unit for performing wireless communication and another communication unit other than the wireless communication unit, comprising:

- a transmission unit configured to transmit authentication information to an external device through a direct communication path between the communication apparatus and the external device established by using said another communication unit;
- a timer which starts when the direct communication path is established by said transmission unit;
- an establishing unit configured to establish a wireless network with the external device by using said wireless communication unit;
- an authentication unit configured to sending the authentication information through the wireless network established by said establishing unit, to make the external device perform authentication;
- a sharing unit configured to share a communication parameter with the external device when authentication is successful by said authentication unit, wherein the pairing process is terminated in response to time up of said timer.

* * * * *